(12) United States Patent
Hagmüller et al.

(10) Patent No.: US 10,941,748 B2
(45) Date of Patent: Mar. 9, 2021

(54) SEA WAVE ENERGY CONVERTER CAPABLE OF RESONANT OPERATION

(71) Applicants: Alex Walter Hagmüller, Portland, OR (US); Max Jacob Levites-Ginsburg, Portland, OR (US)

(72) Inventors: Alex Walter Hagmüller, Portland, OR (US); Max Jacob Levites-Ginsburg, Portland, OR (US)

( * ) Notice: Subject to any disclaimer, the term of this patent is extended or adjusted under 35 U.S.C. 154(b) by 0 days.

(21) Appl. No.: 15/891,717

(22) Filed: Feb. 8, 2018

(65) Prior Publication Data

US 2019/0063395 A1 Feb. 28, 2019

Related U.S. Application Data

(60) Provisional application No. 62/553,100, filed on Aug. 31, 2017, provisional application No. 62/586,845, filed on Nov. 15, 2017.

(51) Int. Cl.
 *F03B 13/18* (2006.01)
 *F03B 17/02* (2006.01)
 *F03B 15/00* (2006.01)

(52) U.S. Cl.
 CPC .......... *F03B 13/1885* (2013.01); *F03B 15/00* (2013.01); *F03B 17/02* (2013.01); *F05B 2270/20* (2013.01)

(58) Field of Classification Search
 CPC .... F03B 13/1885; F03B 15/00; F03B 17/025; F03B 17/04
 USPC .................................................... 290/42, 53
 See application file for complete search history.

(56) References Cited

U.S. PATENT DOCUMENTS

| | | | | |
|---|---|---|---|---|
| 4,196,591 A * | 4/1980 | Wallace | ............. | F03B 13/1895 417/332 |
| 9,145,866 B1 * | 9/2015 | Patel | ................... | F03B 13/1815 |
| 2009/0165455 A1 * | 7/2009 | Gilboa | ................. | F03B 17/025 60/498 |
| 2010/0025993 A1 * | 2/2010 | Raftery | ............... | F03B 13/1885 290/42 |
| 2012/0261923 A1 * | 10/2012 | Hassavari | ........... | F03B 13/1845 290/53 |
| 2012/0306210 A1 * | 12/2012 | Wen | .................... | F03B 13/1885 290/53 |
| 2013/0127168 A1 * | 5/2013 | Dragic | .................. | F03B 13/186 290/53 |
| 2013/0205769 A1 * | 8/2013 | Fievez | .................... | B63B 22/00 60/501 |
| 2015/0076827 A1 * | 3/2015 | Nair | ...................... | H01L 41/125 290/53 |
| 2015/0102604 A1 * | 4/2015 | Patel | ................... | F03B 13/1815 290/53 |
| 2017/0009732 A1 * | 1/2017 | Mundon | ............... | F03B 13/189 |
| 2017/0047820 A1 * | 2/2017 | Degriek | ............... | H02K 7/1853 |
| 2017/0145984 A1 * | 5/2017 | Matthews | ............ | B01D 61/025 |

* cited by examiner

*Primary Examiner* — Sean Gugger
(74) *Attorney, Agent, or Firm* — Christopher Mayle; Thomas E. LaGrandeur; Bold IP, PLLC

(57) ABSTRACT

A sea wave energy harvesting system includes a sea wave energy harvesting vessel positioned in the sea. The sea wave energy harvesting system dynamically adapts the motion of the sea wave energy harvesting vessel responsive to the sensed sea wave conditions to more closely align a resonant frequency of the sea wave energy harvesting vessel with the current harmonic motion of the sea waves.

7 Claims, 14 Drawing Sheets

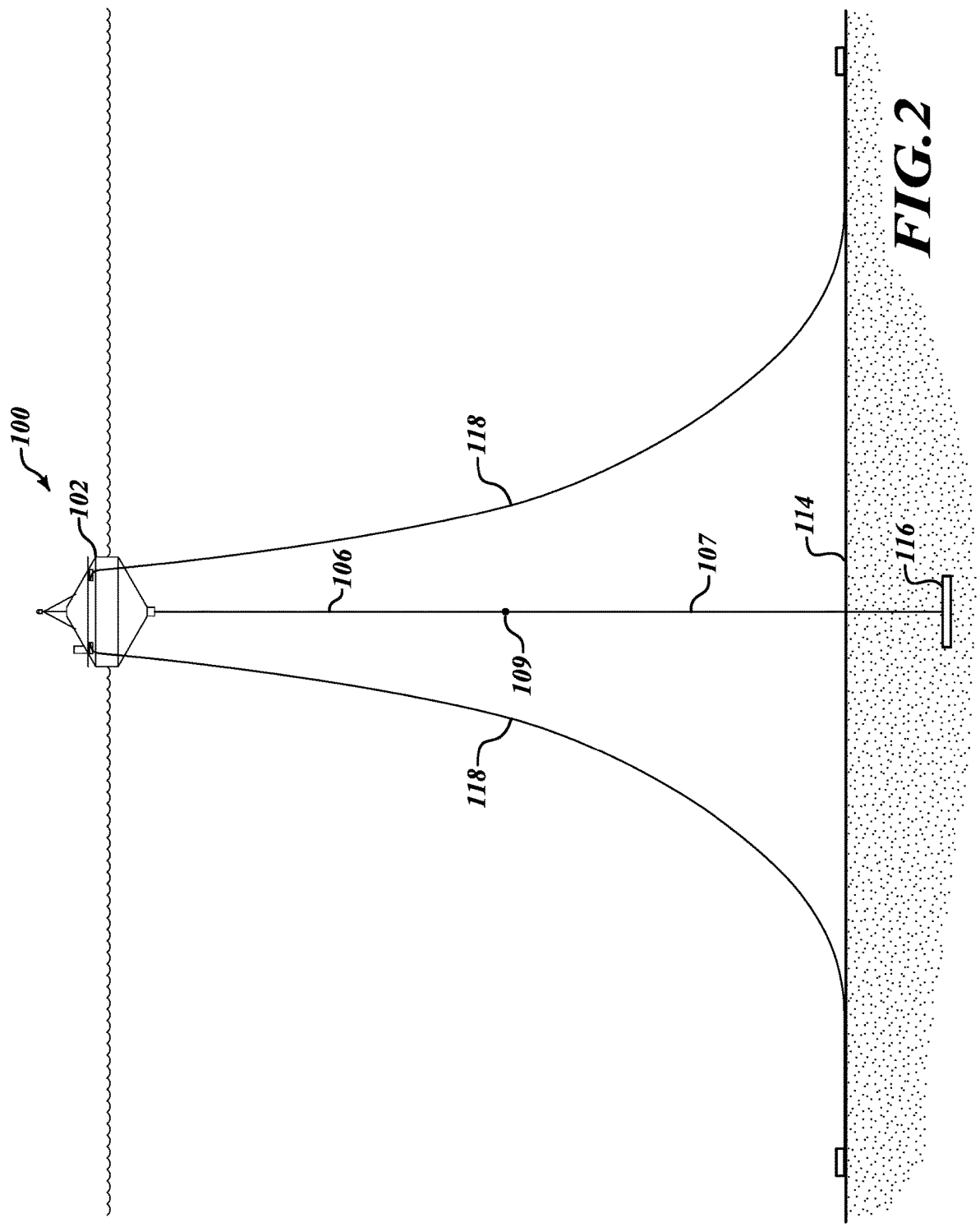

SEA WAVE ENERGY CONVERTER CAPABLE OF RESONANT OPERATION

CROSS-REFERENCE TO RELATED APPLICATIONS

The present application claims priority benefit from U.S. Provisional Patent Application No. 62/553,100, titled "Wave Energy System", filed Aug. 31, 2017. The present application also claims priority benefit from U.S. Provisional Patent Application No. 62/586,845 titled "Resonance Driven Sea Wave Energy Harvester", filed Nov. 15, 2017. U.S. Provisional Patent Application Nos. 62/553,100 and 62/586,845 are incorporated herein by reference.

DESCRIPTION OF THE RELATED ART

Sea waves represent a potentially rich source of energy. Energy harvested from sea waves has many advantages over traditional energy sources. For example, energy harvested from sea waves does not generate pollutants such as carbon dioxide, carbon monoxide, sulfur oxides, oxides of nitrogen, and other pollutants that typically result from combustion processes. Additionally, energy harvested from sea waves does not result in dangerous radioactive waste, unlike current nuclear power generation systems. Furthermore, unlike many other sources of clean energy, energy can be harvested from sea waves in a relatively steady manner because of the consistency of sea waves which typically continue uninterrupted, day and night. Thus, sea waves have the potential to be a clean, safe, and continuous source of energy.

However, traditional sea wave energy harvesting systems and processes do not adequately capture energy from sea waves. For example, traditional sea wave energy harvesting systems and processes do not efficiently harvest energy from the entire cycle of a sea wave. Additionally, in spite of sea waves being relatively steady in the sense that sea waves do not typically entirely stop, the conditions of the sea waves are constantly changing. For example, the height of sea waves, the frequency of sea waves, and even the direction of sea waves are continuously in flux. Traditional sea wave energy harvesting systems are designed to harvest energy in a particular set of sea wave conditions. When sea wave conditions vary from the particular set of sea wave conditions for which the traditional sea wave energy harvesting systems are optimized, then traditional sea wave energy harvesting systems harvest energy in a highly inefficient manner. Thus, traditional sea wave energy harvesting systems and processes are expensive and inefficient. The result is that sea wave energy harvesting is underutilized due to the limitations of traditional sea wave energy harvesting systems and processes.

BRIEF SUMMARY

A sea wave energy harvesting system in accordance with embodiments of the present disclosure overcomes many of the drawbacks of traditional sea wave energy harvesting systems. A sea wave energy harvesting system in accordance with embodiments of the present disclosure monitors current sea wave conditions. The sea wave energy harvesting system includes a sea wave energy harvesting vessel positioned in the sea. The sea wave energy harvesting system dynamically adapts the motion of a sea wave energy harvesting vessel responsive to the sensed sea wave conditions to more closely align a resonant frequency of the sea wave energy harvesting vessel with the current frequency/period of the sea waves. When the resonant frequency of the wave energy harvesting vessel is aligned with the frequency/period of the sea waves, the sea wave energy harvesting system is able to harvest a much larger amount of energy from the sea waves during each wave cycle in comparison with traditional sea wave energy harvesting systems.

In one embodiment, the sea wave energy harvesting vessel is anchored by a towing line to a plate buried beneath the seafloor. A portion of the towing line is wound about a power takeoff drum within the wave energy harvesting vessel. As the wave energy harvesting vessel rises and falls with the motion of the sea waves, the power takeoff drum rotates as the towing line winds and unwinds about the power takeoff drum. A generator is coupled to the power takeoff drum such that the generator can generate electricity with rotation of the power takeoff drum.

In one embodiment, the sea wave energy harvesting system dynamically utilizes the generator as both a generator and as a motor. When the sea wave energy harvesting system uses the generator to generate electricity, the sea wave energy harvesting system generates energy from the generator. When the sea wave energy harvesting system uses the generator as a motor, the sea wave energy harvesting system applies energy to the motor, causing the power takeoff drum to rotate. The rotation of the power takeoff drum winds the towing line about the power takeoff drum, affecting the velocity of the sea wave energy harvesting vessel within the sea water.

In one embodiment, the sea wave energy harvesting vessel and the towing line can be modeled as spring and mass system having a spring constant k. The spring and mass system has a resonant frequency based in part on the spring constant k. The spring constant k depends in part on the rotational configuration of the power takeoff drum and the generator. The sea wave energy harvesting system can dynamically adjust the spring constant k by applying a specific torque profile to the power takeoff drum with the generator. The applied torque is selected to result in a resonant frequency of the sea wave energy harvesting vessel that matches the current conditions of the sea waves.

In one embodiment, the sea wave energy harvesting system uses the motor to drive rotation of the power takeoff drum during selected portions of the sea wave motion, and to dampen rotation of the power takeoff drum during selected portions of the sea wave motion in order to align the motion of the sea wave energy harvesting device with the harmonic motion of the sea waves. The selective driving and damping of the power takeoff drum results in an alignment of the resonant frequency of the sea wave energy harvesting vessel with the current frequency of the sea waves.

In one embodiment, the sea wave energy harvesting vessel generates electricity during upward motion of the sea wave energy harvesting vessel. The upward motion of the sea wave energy harvesting vessel corresponds to the rising of the sea wave energy harvesting vessel from a trough of the sea wave to a peak of the sea wave. During this rising motion, the towing line unwinds about the power takeoff drum, causing rotation of the power takeoff drum. The rotation of the power takeoff drum causes the generator to generate electricity. During the rising motion, the sea wave energy harvesting system extracts energy via the generator which dampens/produces a torque opposing the rotation of the power takeoff drum.

In one embodiment, the sea wave energy harvesting system utilizes the generator to drive rotation of the power takeoff drum during portions of the sea wave cycle in which the sea wave is traversing from peak to trough. Absent the application of energy to the generator to utilize the generator as a motor, the sea wave energy harvesting vessel would tend to travel downward toward the seafloor. With the application of the energy to the generator during this phase of the sea wave cycle, the power takeoff drum rotates more quickly, thereby forcing the winding of the towing line about the power takeoff drum more quickly and pulling the sea wave energy harvesting vessel toward the seafloor.

In one embodiment, the driving and damping of the rotation of the power takeoff drum with the generator has the effect of adjusting the resonant frequency of the sea wave energy harvesting vessel to match the current conditions of the sea waves. The result is that, during power generation cycles, the sea wave energy harvesting vessel harvests a much greater amount of energy from the sea waves because the sea wave energy harvesting vessel rises a greater distance with a greater velocity.

In one embodiment, the wave energy harvesting system is designed from the ground up to be an economically competitive means of energy production and scalable to significantly contribute to meeting the global demand for electricity. This design concept lead to the sea wave energy harvesting system having several beneficial traits. In one embodiment, the wave energy harvesting system is designed to increase power absorption across a spectrum of wave conditions. This is accomplished by applying a control scheme to a generator motoring and generating capabilities. The control system alters the sea wave energy harvesting frequency response, and enhances power absorption in the present wave conditions.

In one embodiment, the simple power takeoff system is capable of using the full height of any given wave with no end stop conditions in the entire range of operation. All of these features are packed into a strong, simple and economical hull, with a reliable secondary catenary mooring system.

In one embodiment, the sea wave energy harvesting vessel is designed to operate at a scale appropriate to be a realistic solution for energy demands. The sea wave energy harvesting system can include multiple sea wave energy harvesting vessels deployed in an array or farm configuration, with multiple sea wave energy harvesting vessels deployed in quantity to reach a selected power output.

In one embodiment, the low cost and scalability would allow the wave energy vessel to fill niches in the energy production ecosystem from small to large. Sea wave energy harvesting vessels could be deployed to service small and remote coastal villages where large centralized solutions could never service due to lack of interconnection. This would displace the alternative power source, which is typically fossil fuels. Wave motion is translated to rotation of electric generators.

BRIEF DESCRIPTION OF THE SEVERAL VIEWS OF THE DRAWINGS

FIG. 2 is an illustration of a sea wave energy harvesting system, according to one embodiment.

DETAILED DESCRIPTION

Figure 1:
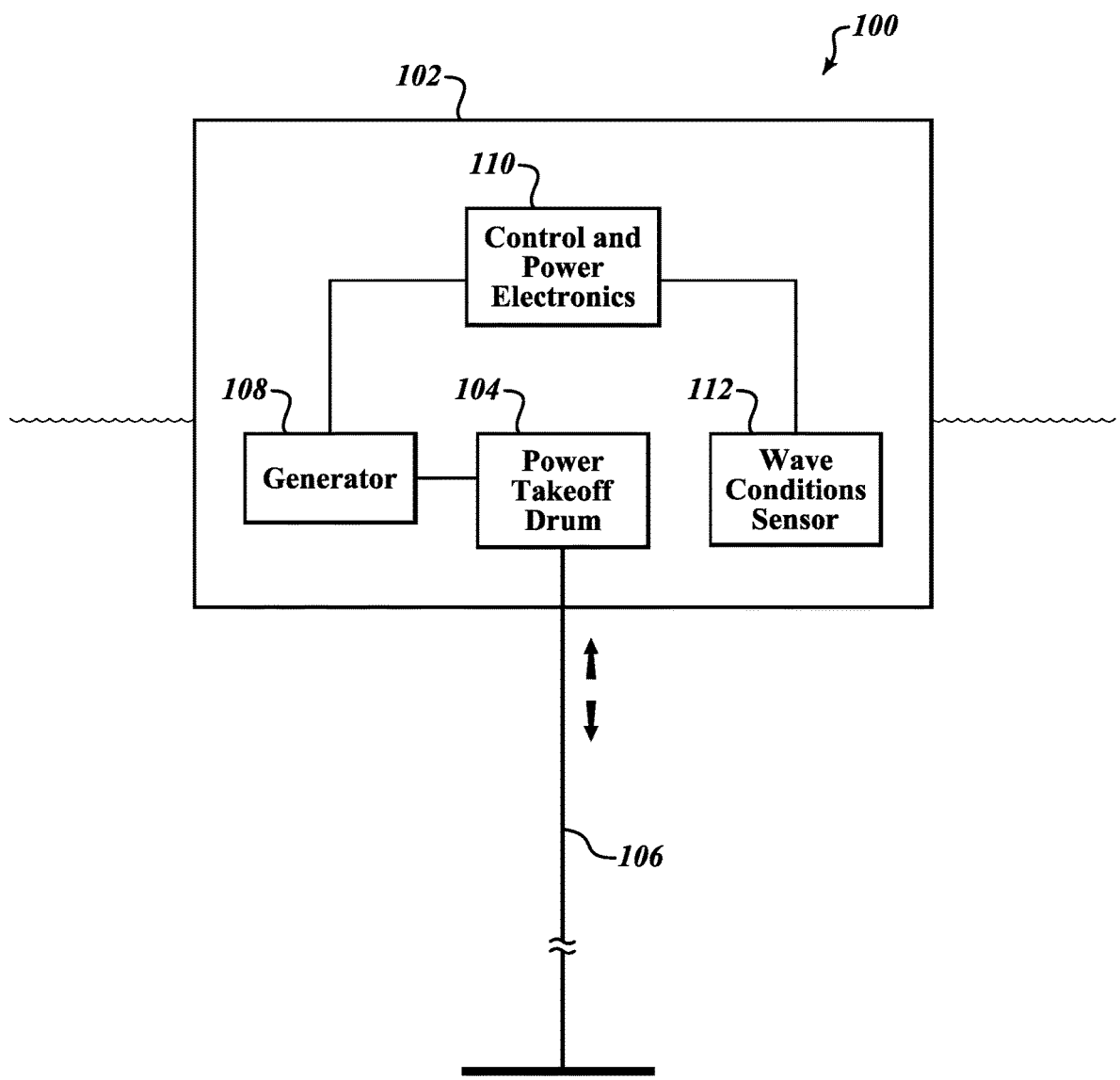
FIG. 1 is a block diagram of a sea wave energy harvesting system, according to one embodiment.

FIG. 1 is a simplified block diagram of a sea wave energy harvesting system 100, according to one embodiment. The sea wave energy harvesting system 100 includes a sea wave energy harvesting vessel 102. The sea wave energy harvesting vessel 102 includes a power takeoff drum 104, a generator 108, power and control electronics 110, and a wave conditions sensor 112. A towing line 106 is coupled between the power takeoff drum 104 and the sea floor. The components of the sea wave energy harvesting system 100 cooperate together to harvest energy from sea waves.

In one embodiment, the sea wave energy harvesting system 100 utilizes the power takeoff drum 104 to enable the harvesting of energy from the sea waves based on the motion of the sea wave energy harvesting vessel 102 within the waves. In particular, the towing line 106 is wound about the power takeoff drum 104. As the sea wave energy harvesting vessel 102 rises relative to the seafloor with a wave approaching its peak, the towing line 106 partially unwinds from the power takeoff drum 104. The unwinding of the towing line 106 from the power takeoff drum 104 causes the power takeoff drum 104 to rotate in a first rotational direction. As the sea wave energy harvesting vessel 102 descends closer to the seafloor with a wave approaching its trough, the towing line 106 winds about the power takeoff drum 104. The winding of the towing line 106 about the power takeoff drum 104 causes rotation of the power takeoff drum in a second rotational direction. The sea wave energy harvesting system 100 uses the rotation of the power takeoff drum 104, caused by the motion of the sea wave energy harvesting vessel 102 within the sea waves, to harvest energy from the sea waves.

In one embodiment, the sea wave energy harvesting system 100 utilizes the generator 108 to generate electricity based on the rotation of the power takeoff drum 104. The generator 108 and the power takeoff drum 104 are coupled together such that the rotation of the power takeoff drum 104 causes rotation of a rotor within the generator 108. The rotation of the rotor within the generator 108 creates the potential for the generator 108 to generate electricity, by applying an opposing torque to the generator through the control system. In this way, the wave energy harvesting system 100 utilizes the generator 108 to generate electricity.

In one embodiment, the power takeoff drum 104 and the generator 108 are fixed to a common power takeoff shaft. With the power takeoff drum 104 and the generator 108 on a common power takeoff shaft, rotation of the power takeoff drum 104 causes rotation of the power takeoff shaft, which, in turn, causes rotation of a rotor of the generator 108. Additionally, as will be set forth in more detail below, rotation of the generator 108 will cause rotation of the power takeoff drum 104.

In one embodiment, the power takeoff drum 104 and the generator 108 are coupled together by a gearbox. The gearbox defines a gear ratio that multiplies the number of rotations the generator 108 will undergo for a selected number of rotations of the power takeoff drum 104. In this way, rotation of the power takeoff drum at a particular angular velocity will cause the rotor of the generator 108 to rotate with a higher or lower angular velocity in accordance with the gear ratio. This can be beneficial for the generation of electricity with the generator 108.

In one embodiment, in order to improve the efficiency of the sea wave energy harvesting system 100, the sea wave energy harvesting system 100 utilizes the power and control electronics 110 and the generator 108 to adjust the motion of the sea wave energy harvesting vessel 102. In particular, the sea wave energy harvesting system 100 adjusts the harmonic motion of the sea wave energy harvesting vessel 102 to more nearly match the conditions of the sea. The power and control electronics 110 operate the generator 108 as a motor during selected portions of a sea wave cycle in order to adjust the motion of the sea wave energy harvesting vessel 102.

In one embodiment, the power and control electronics 110 are electrically coupled to the generator 108 and can control the operation of the generator 108. In particular, the power and control electronics 110 can control the generator 108 to operate as a generator during certain selected portions of a wave cycle, and to act as a motor during other selected portions of the wave cycle. The coupling of the power takeoff drum 104 to the generator 108 that enables the power takeoff drum 104 to cause the generator 108 to rotate also enables the generator 108 to cause the power takeoff drum 104 to rotate when the generator 108 is operated as a motor. The motorized rotation of the power takeoff drum 104 causes the power takeoff drum 104 to wind the towing line 106. The winding and unwinding of the towing line around the power takeoff drum 104 causes or enables the sea wave energy harvesting vessel 102 to rise and fall within the sea waves. Thus, the power and control electronics 110 can operate the generator 108 in a manner to adjust or control the motion of the sea wave energy harvesting vessel 102 within the water.

In one embodiment, the sea wave energy harvesting vessel 102 and the towing line 106 can be conceptually modeled as a spring and mass system. The spring and mass system have spring constant k and a mass m. Such a spring and mass system will have a resonant frequency that depends on the spring constant k and the mass m. If the resonant frequency associated with a sea wave energy harvesting system does not match the frequency of the sea waves, then the sea wave energy harvesting system will harvest energy less efficiently from the sea waves.

In one embodiment, the sea wave energy harvesting system 100 advantageously utilizes the control and power electronics 110 and the generator 108 to dynamically adjust the spring constant K associated with the sea wave energy harvesting vessel 102 and the towing line to modify the system dynamics such that the device resonant frequency matches the current frequency of the sea waves. The sea wave energy harvesting system 100 adjusts the spring constant k of the sea wave energy harvesting vessel 102 and the towing line 106 by applying a selected torque profile to the power takeoff drum 104 via the generator 108. The control and power electronics 110 can operate the generator 108 as a motor by applying power to the generator 108 in a selected manner. The application of torque to the power takeoff drum 104 via the generator 108 can have the effect of augmenting the rotation of the power takeoff drum 104 or resisting the rotation of the power takeoff drum 104. The selected application of torque to the power takeoff drum 104 has the effect of adjusting the spring constant k of the sea wave energy harvesting vessel. Thus, the control and power electronics 110 can cause the generator 108 to apply torque to the power takeoff drum 104 in such a way to match the resonant frequency of the sea wave energy harvesting vessel 102 to the current frequency of the sea waves. If the sea wave energy harvesting vessel 102 and the towing line 106 have a resonant frequency that matches the frequency of the sea waves, the sea wave energy harvesting vessel 102 will harvest a far greater amount of energy from the sea waves than if the resonant frequency of the sea wave energy harvesting vessel 102 and the towing line 106 do not align with the frequency of the sea waves.

In one embodiment, the power and control electronics 110 operate the generator 108 as a motor during the portion of a wave cycle in which the wave is progressing from peak to trough. When the water level at a position of the sea wave energy harvesting vessel 102 begins to fall, the power and control electronics 110 supplies power to the generator 108 in order to operate the generator 108 as a motor. The power and control electronics 110 supplies power to the generator 108 in a manner that will cause rotation of the power takeoff power takeoff drum 104 in a direction that will wind the towing line 106 about the power takeoff drum 104. The winding of the towing line 106 about power takeoff drum 104 has the effect to pull the sea wave energy harvesting vessel 102 downward toward the seafloor where the towing line 106 is anchored. The control electronics therefore cause the generator 108 to adjust the downward motion of the sea wave energy harvesting vessel 102 during descending phases of sea waves.

In one embodiment, the power and control electronics 110 operate the generator 108 as a generator when a sea wave is ascending from a trough toward a peak. Thus, the power and control electronics 110 cease operating the generator 108 as a motor when the sea wave begins to rise again toward a peak. The rise in the sea wave causes the sea wave energy harvesting vessel 102 to rise, thereby unwinding the towing line around the power takeoff power takeoff drum 104. The unwinding of the towing line 106 causes the power takeoff drum 104 to rotate in a direction opposite to the rotational direction of the power takeoff drum 104 during the motoring phase. The rotational motion of the power takeoff drum 104 causes the generator 108 to generate electricity. Thus, the power and control electronics 110 enable the generator 108 to generate electricity during upward phases of sea waves.

In one embodiment, a benefit of using the generator 108 as a motor during downward motion is that the towing line 106 can be safely wound about the power takeoff drum 104 during downward motion. Absent the forced rotation of the power takeoff drum 104, it is possible that the towing line 106 would become slack as the sea wave energy harvesting vessel 102 descends toward the trough of the wave. In this case, the towing line 106 may not wind about the power takeoff power takeoff drum 104. If the towing line 106 does not wind about the power takeoff drum 104 during downward motion, then the upward motion of the sea wave energy harvesting vessel 102 would not cause the towing line 106 to unwind during the upward motion of the sea wave energy harvesting vessel 102. If the towing line 106 does not unwind during the upward motion of the sea wave energy harvesting vessel 102, then the power takeoff drum 104 will not rotate and the generator 108 will not generate electricity. However, because the generator 108 acts as a motor during the downward motion of the sea wave energy harvesting vessel 102, the power takeoff drum 104 is forced to rotate, thereby winding the towing line 106 about the power takeoff drum 104 during the downward motion of the sea wave energy harvesting vessel 102. This ensures that the towing line 106 will not become slack or otherwise improperly wound about the power takeoff drum 104.

In one embodiment, another benefit of the using the generator 108 as a motor during downward motion of the sea wave energy harvesting vessel 102 is that the downward motion of the sea wave energy harvesting vessel 102 can be adjusted in a manner that enhances the efficiency of harvesting energy from the sea wave energy harvesting vessel during upward motion of the sea wave energy harvesting vessel 102. In a simplified example, the sea wave energy harvesting vessel 102 is buoyant. A portion of the sea wave energy harvesting vessel 102 is submerged in the seawater, and a portion of the sea wave energy harvesting vessel 102 is above the water. The sea wave energy harvesting vessel 102 rises and falls with the motion of the sea waves. However, the frequency of the sea waves, the amplitude of the sea waves, the direction of propagation of the sea waves, the buoyant forces on the sea wave energy harvesting vessel 102, the frictional forces on the sea wave energy harvesting vessel 102, and other forces and influences on the motion of the sea wave energy harvesting vessel 102 can result in the sea wave energy harvesting vessel 102 not being able to harvest energy from sea waves from the full extent of the trough of the wave to the peak of the wave, due, for example, to a mismatch between the resonant frequency of the sea wave energy harvesting vessel 102 and the sea waves. Thus, the various conditions of the sea waves and the properties of the sea wave energy harvesting vessel 102 can result in inefficiently harvesting energy from the sea waves during the energy harvesting portions of sea wave cycles. Utilizing the generator 108 as a motor augments the downward motion of the sea wave energy harvesting vessel 102 by pulling the sea wave energy harvesting vessel 102 downward during the downward portions of the sea wave cycles. The result is that the sea wave energy harvesting vessel 102 can harvest a greater amount of energy from the sea waves during the upward portions of the sea wave cycles.

In one embodiment, the sea wave energy harvesting system 100 operates the generator 108 to apply a torque to the power takeoff drum sufficient to entirely submerge the sea wave energy harvesting vessel 102. This can be beneficial when sea wave conditions are particularly dangerous. Submerging the sea wave energy harvesting vessel 102 can protect the sea wave energy harvesting vessel from damage. The sea wave energy harvesting system 100 can operate the generator 108 to apply a break to the power takeoff drum, or can apply a brake to the power takeoff drum in another manner, to prevent upward travel when the sea wave energy harvesting vessel 102 has been fully submerged or in other selected circumstances.

In one embodiment, the sea wave energy harvesting system 100 utilizes the wave conditions sensor 112 to enable the sea wave energy harvesting vessel 102 to more efficiently harvest energy from the sea waves. The wave conditions sensor 112 senses conditions of the sea waves in the environment of the sea wave energy harvesting vessel 102. The wave conditions sensor 112 can sense one or more of the frequency of the sea waves, the average trough to peak amplitude of the sea waves, current amplitude patterns in the sea waves, the direction of propagation of the sea waves, wind conditions, and other parameters associated with the sea waves. The sea wave energy harvesting system 100 utilizes the sensed conditions to improve the energy harvesting efficiency of the sea wave energy harvesting vessel 102.

In one embodiment, the wave conditions sensor 112 is positioned external to the sea wave energy harvesting vessel 102. For example, the sea wave conditions sensor 112 can include a wave forecast buoy positioned in the sea in the vicinity of the sea wave energy harvesting vessel 102. The wave forecast buoy can sense parameters of the sea waves, such as frequency and amplitude, and can transmit wave condition data to the sea wave energy harvesting vessel 102. The wave conditions sensor 112 can include one or more sensors that are external to the sea wave energy harvesting vessel 102, and one or more sensors data coupled to the sea wave energy harvesting vessel 102. The wave conditions sensor 112 can include sensors or components placed in an interior of the sea wave energy harvesting vessel 102 and/or coupled to an exterior of the sea wave energy harvesting vessel 102. Thus, the sea wave energy harvesting vessel 100 can receive wave conditions data from multiple sources.

In one embodiment, the wave conditions sensor 112 generates wave conditions data indicative of the conditions of the sea waves and passes the wave conditions data to the power and control electronics 110. The power and control electronics 110 receive the wave conditions data from the wave conditions sensor 112 and operate the generator 108 in accordance with the wave conditions data, for example, by effectively adjusting the spring constant of the sea wave energy harvesting vessel 102 via the selected application of a torque profile to the generator 108. The power and control electronics 110 controls the generator 108 to operate as a motor to adjust the motion of the sea wave energy harvesting vessel 102 during the downward portions of the wave cycles. In particular, the sea wave energy harvesting vessel 102 adjusts the motion of the wave energy harvesting vessel 102 to more nearly match the harmonic motion of the sea waves. The adjusted motion of the sea wave energy harvesting vessel 102 during the downward portions of the wave cycles enables the energy harvesting vessel 102 to more efficiently harvest energy from the sea waves during the upward portions of the sea wave cycles.

In one embodiment, the torque profile includes a torque that varies in a selected manner during the downward phase of the sea wave cycle. In one embodiment, the torque profile is a constant torque.

In one embodiment, the generator 108 is a brushless DC machine, which is directly coupled to the power takeoff drum 104. The DC machine is capable of applying a torque on the power takeoff drum 104 in either direction. Power generation can be achieved by applying a negative or downward force while the motion of the sea wave energy harvesting vessel is positive or upwards. Return force is achieved by applying a negative or downward force while the sea wave energy harvesting vessel 102 is moving downward. In one embodiment, force is never generated in the positive direction, as that would cause the tension in the towing line 106 to go slack.

In one embodiment, the control system determines the instantaneous torque produced by the DC machine. Multiple variables describing the current state of the sea wave energy harvesting vessel 102 are used by the control and power electronics 110 to determine the sea wave energy harvesting vessel's current performance profile. The signals considered are motor current, motor voltage, drum position, and drum velocity as well as environmental signals such as wave forecasting data.

In one embodiment, the tuning parameters in the control and power electronics 110 can be set to configure specific relationships between input signals and the control system output. In one embodiment, the generated power is temporarily stored both electrically, and in a mechanical spring. The electric portion is converted prior to transmission. The mechanical spring stored energy is used to provide the majority of the returning force required for the power takeoff. The net power generated is the power produced during the up swell of the wave minus the power consumed while returning to home position at the bottom of the wave. The path of an object in an ocean wave is orbital so the power consumed during motoring/reeling in of the sea wave energy harvesting vessel 102 is small, consisting only of the power required to reel the weight of the towing line 106, associated power takeoff friction losses and minor hydrodynamic losses. Since the sea wave energy harvesting vessel 102 operates on a taut mooring, with a secondary catenary mooring system, it will have a small watch circle in operation.

In one embodiment, the wave energy device is designed to have enough of the combined anchor/power cord in storage on the power takeoff power takeoff drum such that it will never encounter an end-stop event in the range of waves expected in an installation location.

In one embodiment, because the sea wave energy harvesting vessel 102 directly drives its generators 108, there are no secondary conversions steps to making electricity. While there are no secondary conversions steps to producing electricity, since the sea wave energy harvesting vessel 102 relies on the ability to drive the power takeoff drum 104, the sea wave energy harvesting vessel 102 can include an onboard energy storage. The onboard energy storage can include one or more batteries, one or more super capacitors, one or more flywheels, or other kinds of energy storage devices from which energy can be drawn to drive the generator 108.

In one embodiment, the control and power electronics 110 include a solid-state control system. The solid-state control system includes one or more processors executing software instructions that switch the generator 108 between power generation modes and motoring modes by monitoring the motor current, the velocity, and the motion of the sea wave energy harvesting vessel itself. The monitoring can be performed, in part, by a three-axis accelerometer. The control system is configured to control the instantaneous torque produced by the generator 108 to the power takeoff. By applying torque in a direction opposing the power takeoff motion, power is extracted from the sea waves. By applying torque in the same direction as the power takeoff motion, power is added to the system. The control system efficiently extracts power from any wave condition by constant precise control of the direction and magnitude of the torque applied to the power takeoff.

In one embodiment, the core of the control system is a torque controller for the generator 108. The torque controller has a fast and accurate response time so that it can create any commanded torque substantially instantaneously. The torque command sent to the generator is derived based on the current conditions of the sea waves and the parameters of the sea wave energy harvesting vessel 102 and its power takeoff. The control system can also condition the generated power prior to being provided to an external power processor that can then provide generated electricity to the grid.

In one embodiment, the torque controller applies torque only in a direction that will create tension on the towing line 106 in order to prevent creating slack in the towing line 104. If the position of the sea wave energy harvesting vessel 102 exceeds a low position limit, which means the distance between the sea wave energy harvesting vessel 102 and the seafloor has exceeded the maximum limit, such as in a very large sea state, then the torque command will be overwritten with a static damping only value. If the position of the sea wave energy harvesting vessel exceeds the high position limit, which means the towing line 106 is nearly fully wound around the power takeoff drum 104 and the sea wave energy harvesting vessel 102 is as close to the seafloor as it should be normal operation, then zero torque will be applied.

In one embodiment, the control and power electronics 110 are utilized to produce a consistent output to a local power grid, and to store power for use in the motoring of the wave energy sea wave energy harvesting vessel 102 during the non-power-producing part of the wave cycle. In one embodiment, the output of the generator 108 is first rectified into DC. A solid-state switch operating at variable duty cycle controls the output current, influencing the generator torque and therefore damping of the system. The energy output by the generator 108 is stored in an ultracapacitor appropriate for the high capacity, rapid, and numerous charge/discharge cycles. The voltage of the capacitor bus will vary with the amount of energy currently stored. In one embodiment, a DC to DC converter is used to convert the capacitor bus voltage to a consistent intermediate storage voltage. A battery is inserted at this stage to provide consistent and reliable power in case of periods of no wave energy capture. This intermediate storage bus powers a motor drive used to run the generators as motors to cause the sea wave energy harvesting vessel to return to its home position at the bottom of a sea swell, and re-start the power production cycle. In one embodiment, the final converter stage boosts the intermediate bus voltage to a final output voltage. This part of the design is independent from the rest of the power electronics and would be designed to create an output voltage appropriate for the power consumer, which could be a grid connection or an offshore energy consumer.

In one embodiment, in the case of a small energy consumer, AC output voltage may be most efficient overall. For a typical connection to a large grid, high voltage DC will likely be the most appropriate form of electricity transmission. A high voltage inverter at the nearest utility substation would convert the high voltage DC for grid interconnect. In one embodiment, all of the power electronics currently exist in industrial operation. Solid state power conversion devices typically achieve efficiency greater than 90%.

In one embodiment, the power and control electronics 110 can include portions located in or on the sea wave energy harvesting vessel 102. The power and control electronics 110 can also include portions remote from the sea wave energy harvesting vessel 102. The power and control electronics 110 can include one or more processors and one or more computer readable media storing software instructions that can be executed by the processors in order to control the generator 108. Furthermore, the power and control electronics 110 can include power electronics that assist in generating electricity and in applying power to the generator 108. The power electronics can include one or more rectifiers, one or more DC to DC voltage adjuster, one or more voltage transformers, one or more inverters, and other electronics suitable for harvesting electricity from the generator 108 and applying electricity to the generator 108 under the control of control electronics.

In one embodiment, the power takeoff drum 104 can includes a power takeoff sheave. In one embodiment, the power takeoff drum includes a towing drum.

FIG. 2 is an illustration of a sea wave energy harvesting system 100, according to an embodiment. The sea wave energy harvesting system 100 includes a sea wave energy harvesting vessel 102. The sea wave energy harvesting vessel 102 is coupled by a towing line 106 to a plate 116 buried beneath the seafloor 114. The sea wave energy harvesting vessel 102 is coupled to catenary mooring lines 118. The components of the sea wave energy harvesting system 100 cooperate together to assist in harvesting energy from sea waves.

In one embodiment, the towing line 106 is coupled to an anchor line 107 by a coupling 109. The anchor line 107 is attached to the buried plate 116. Thus, the sea wave energy harvesting vessel 102 is coupled to the plate 116 by the towing line 106 and the anchor line 107.

In one embodiment, the anchor line 107 is selected to withstand the saltwater environment in which the anchor line 107 will be placed. The materials, manufacture, and shape of the anchor line 107 are selected to resist corrosion by seawater. The characteristics of the anchor line 107 are also selected to withstand the forces that will be applied to the anchor line 107 via the towing line 106 due to the buoyant forces acting on the sea wave energy harvesting vessel 102 and the torque applied to the power takeoff drum 104 by the generator 104 during motoring phases. The anchor line 107 can include one or more of a rope, a chain, or a cable.

In one embodiment, the towing line 106 includes a material selected to withstand the saltwater environment, to withstand the tensions associated with motoring and generating electricity, and to reliably wind and unwind without becoming entangled or slack. The towing line 106 can include an aramid synthetic rope, a double braided rope, a triple braided rope, a spectra synthetic rope, a polymer encapsulated rope, a steel rope or cable, a stainless composition, or other materials. Those of skill in the art will recognize, in light of the present disclosure, that the towing line 106 can include other materials or combinations of materials in accordance with principles of the present disclosure.

In one embodiment, the towing line 106 can have a cross-sectional shape selected to facilitate stable and reliable winding and unwinding about the power takeoff drum 104. In one embodiment, the towing line 106 can have a substantially circular cross-section. In one embodiment, the towing line 106 can have a substantially ovular cross-section. In one embodiment, the towing line 106 can have a cross-section similar to a flat belt or strap. Those of skill in the art will recognize, in light of the present disclosure, that the towing line 106 can include many kinds of cross-sectional shapes in accordance with principles of the present disclosure.

In one embodiment, the sea wave energy harvesting vessel 102 is positioned in water having an equilibrium depth between 20 m and 200 m. Most typically, the sea wave energy harvesting vessel 102 can be positioned in water having an equilibrium depth of between 30 and 100 m. The towing line 106 and the anchor line 107 may be connected to each at a depth corresponding to about half the equilibrium depth of the sea wave energy harvesting vessel 102. The towing line 106 will have a total length that includes the length between the coupling 109 and the sea wave energy harvesting vessel 102 plus at least the expected maximum displacement from equilibrium of the sea wave energy harvesting vessel 102. The anchor line 107 can have a length corresponding to a distance between the seafloor 114 and the coupling 109 plus the depth of the plates 116 below the seafloor 114. Those of skill in the art will recognize, in light of the present disclosure, that the coupling 109 can be located at a position different than midway between the seafloor 114 and the equilibrium position of the seafloor energy harvesting vessel 102. Thus, the relative lengths of the towing line 106 and anchor line 107 can be selected in accordance with the desired position of the coupling 109.

In one embodiment, the sea wave energy harvesting system 100 includes catenary mooring lines 118. The catenary mooring lines 118 provide mooring support for the sea wave energy harvesting vessel 102 in addition to the towing line 106 and the anchor line 107. The catenary mooring lines 108 hang from the sea wave energy harvesting vessel 102 and connect to anchors in the seafloor 114. The catenary mooring lines 118 can include materials, thicknesses, and shapes selected to withstand seawater and forces resulting from harsh sea conditions. The sea wave energy harvesting system 100 can include four catenary mooring lines 118.

In one embodiment, the sea wave energy harvesting system 100 can include a power line (not shown) that follows or is coupled to one of the catenary mooring lines 118. The powerline can connect to a floating power station or to an onshore power station. The powerline carries electricity generated by the sea wave energy harvesting vessel 102 to a power station so that the electricity can be modified and provided to the power grid.

Figure 3A:
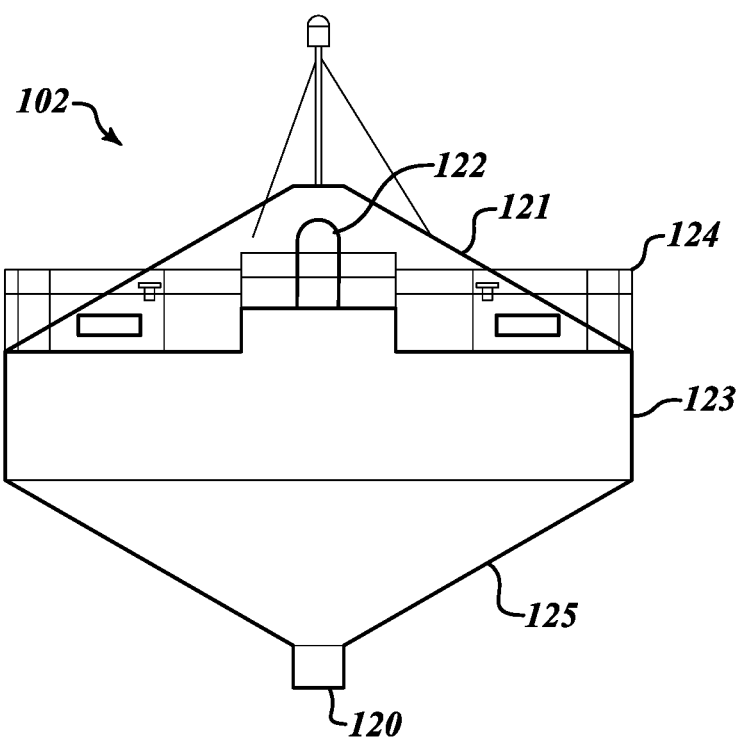
FIG. 3A is a side view of a sea wave energy harvesting vessel, according to one embodiment.

FIG. 3A is a side view of a sea wave energy harvesting vessel 102, according to an embodiment. The sea wave energy harvesting vessel 102 is configured to float in the seawater and to rise and fall with sea waves. The sea wave energy harvesting vessel 102 can generate electricity based on the motion of the sea wave energy harvesting vessel 102 in the sea waves.

In one embodiment, the sea wave energy harvesting vessel is a point absorber. The sea wave energy harvesting vessel 102 includes a top portion, a middle portion, the bottom portion. The top portion includes a 120° symmetrical cone shape with the cone directed upward. The bottom portion includes a 120° symmetrical cone shape with the cone directed downward. The middle portion includes a cylinder shape extending between the bottom portion and the top portion.

In one embodiment, the top conical portion of the sea wave energy harvesting vessel 102 has a height of about 4 m. The bottom conical portion of the sea wave energy harvesting vessel 102 has a height of about 4 m. The middle cylindrical portion has a height of about 3 m. Thus, in one embodiment, the sea wave energy harvesting vessel 102 as a total height of about 11 m. The middle cylindrical portion has a diameter of about 15 m. In one embodiment, the mass of the sea wave energy harvesting vessel is about 175,000 kg. In one embodiment, the displaced volume of the sea wave energy harvesting vessel 102 is about 520 m³. In one embodiment, the equilibrium waterline is about 2 m below the vertical center of the cylindrical middle section. Those of skill in the art will recognize, in light of the present disclosure, that the sea wave energy harvesting vessel 102 can have shapes and dimensions other than those set expressly described or shown herein. All such other shapes and dimensions fall within the scope of the present disclosure.

In one embodiment, the sea wave energy harvesting vessel 102 includes a towing line opening 120 positioned at the bottom of the sea wave energy harvesting vessel 102. The towing line opening 102 is configured to enable the towing line 106 (not shown in FIG. 3A) to pass from an interior of the sea wave energy harvesting vessel 102 to an exterior of the sea wave energy harvesting vessel 102.

In one embodiment, the sea wave energy harvesting vessel 102 includes a port 122 in the upper conical section. The porch 122 enables personnel to enter into an interior of the sea wave energy harvesting vessel 102 in order to monitor a condition of the interior of the energy harvesting vessel 102, to perform repairs on the sea wave energy harvesting vessel 102, or to otherwise operate or maintain the sea wave energy harvesting vessel 102.

In one embodiment, the sea wave energy harvesting vessel 122 includes an external rail 124. The rail 124 can enable personnel to safely stand on an and external surface of the sea wave energy harvesting vessel 102 without falling off the sea wave energy harvesting vessel 102. The sea wave energy harvesting vessel 122 can also include a ladder that enables personnel to climb onto the external surface of the sea wave energy harvesting vessel 102.

Those of skill in the art will recognize, in light of the present disclosure, that the particular shapes, dimensions, and features of the sea wave energy harvesting vessel 102 shown in FIG. 3A and described in relation to FIG. 3A are given as one possible embodiment of a sea wave energy harvesting vessel 102. A sea wave energy harvesting vessel 102 in accordance with principles of the present disclosure can have shapes, features, dimensions, other than those shown and described herein. All such other shapes, features, and dimensions fall within the scope of the present disclosure.

In one embodiment, the sea wave energy harvesting vessel 102 includes a steel hull defined by the upper, middle, and lower portions. The steel used in the hull of the wave energy device can be an economical and common ASTM A131 Grade AH used in the construction of ocean vessels. The concrete used for ballast can be a common 4000 PSI (28 MPa) strength mix. In one Alternatively, the sea wave energy harvesting vessel 102 can include other suitable materials. In one embodiment, the hull includes a composite material. In one embodiment, the hull includes a fiber reinforced plastic. In one embodiment, the hull includes a carbon fiber material.

In one embodiment, the opposite ends of the power takeoff beams are supported by a set of smaller beams running along the lower section 121 and tie to the base of the central cylindrical section 123, triangulating the main load bearing structure and stiffening the plating of the lower section 121.

In one embodiment, the equipment deck beams are supported by a reinforcement ring on the outer portion of the hull, and stiffeners run upwards along the plating of the upper section 121, the middle section 123, and lower section 125, stiffening the support ring and hull plating. Horizontal stiffeners are run concentrically at a set vertical spacing, strengthening the hull plating.

In one embodiment, another set of 4 large beams run at 90-degree angles from the central section 123 to the outer hull, supporting the main equipment deck and stiffening the structure radially. The catenary mooring posts/tow posts are tied to these beams at the front and rear of the sea wave energy harvesting vessel 102. Reinforced concrete ballast is place in the bottom of the hull. The equipment deck is plated which provides a work area as well as stiffens the equipment deck beams.

In one embodiment, the steel hull is estimated to weigh about 100 metric tons in the configuration shown. The concrete ballast is estimated to weigh about 33 metric tons. The remaining equipment, power takeoff, and generators are estimated to weigh about 42 metric tons, in one embodiment. The total device mass is estimated at about 175 metric tons with the hull steel comprising approximately 57% of the total mass, the concrete ballast comprising approximately 19%, and the generators, power takeoff and remaining equipment comprising the remaining 24% of the mass of the sea wave energy harvesting vessel 102.

In one embodiment, the electric power production is accomplished by developing a high tensile force between the mooring of the sea wave energy harvesting vessel 102 and the power takeoff drum 104 by the buoyant force of the sea wave energy harvesting vessel 102 and its upward motion while riding on ocean waves. This produces a torque in the power takeoff shaft, which is directly coupled to each generator 108, as well as a producing a vertical load in each bearing.

In one embodiment, the maximum power takeoff torque is estimated at 5300 kN*m, with a combined anchor/power cord tensile load of 3120 kN. The power takeoff drum 104 is supported in two bearings, and the maximum power takeoff drum 104 support bearing vertical load is 1560 kN each. In one embodiment, the two generators 108 each develop a maximum torque of 2650 kN*m. The maximum estimated operational rotational velocity is 7 RPM. Each generator is assumed to be supported at 4 points for this analysis, 2 each at the front and 2 each at the rear. Each point sees 207 kN vertically, with the two points closest to the center of the sea wave energy harvesting vessel 102 having a downward direction and the two furthest from the center an upward direction. In one embodiment, each of the generators' rotors are supported in two bearings, with an estimated maximum operational bearing force of 61 kN vertically downward. The generator and power takeoff loads are transferred to main support beams on the equipment deck of the sea wave energy harvesting vessel 102. The load is then transferred to the central power takeoff structure support tube and reinforcement ring, as well as the to the outer equipment deck, through a set of support beams mounted against the hull plating, and through the hull stringers and stiffeners to the plating, where the wave energy device is supported by water pressure exerted across the wetted portion of the hull.

In one embodiment, high stress locations are estimated to be at the junction of the main support beams to the hull plating. In one embodiment, bottom slamming of the sea wave energy harvesting vessel 102 in high energy sea states and horizontal slamming of waves against the hull will be the highest loading the structure will see in normal function.

Figure 3B:
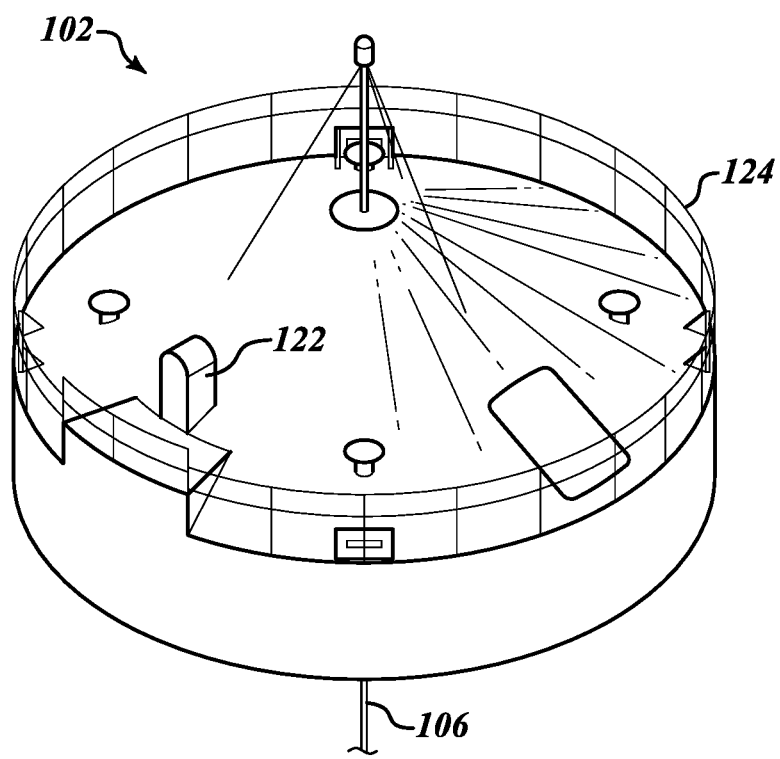
FIG. 3B is an elevated perspective view of a sea wave energy harvesting vessel, according to one embodiment.

FIG. 3B is an elevated perspective view of the sea wave energy harvesting vessel 102 of FIG. 3A, according to one embodiment. The elevated perspective view of FIG. 3B illustrates more clearly a flat space in front of the ports 122 that enables personnel to stand stably on an external surface of the sea wave energy harvesting vessel 102 in front of the port 122. The perspective view also illustrates more clearly mounting points for the catenary mooring lines 118 on the external surface of the sea wave energy harvesting vessel 102. FIG. 3B also illustrates the towing line 106 extending downward from the sea wave energy harvesting vessel 102.

Figure 4A:
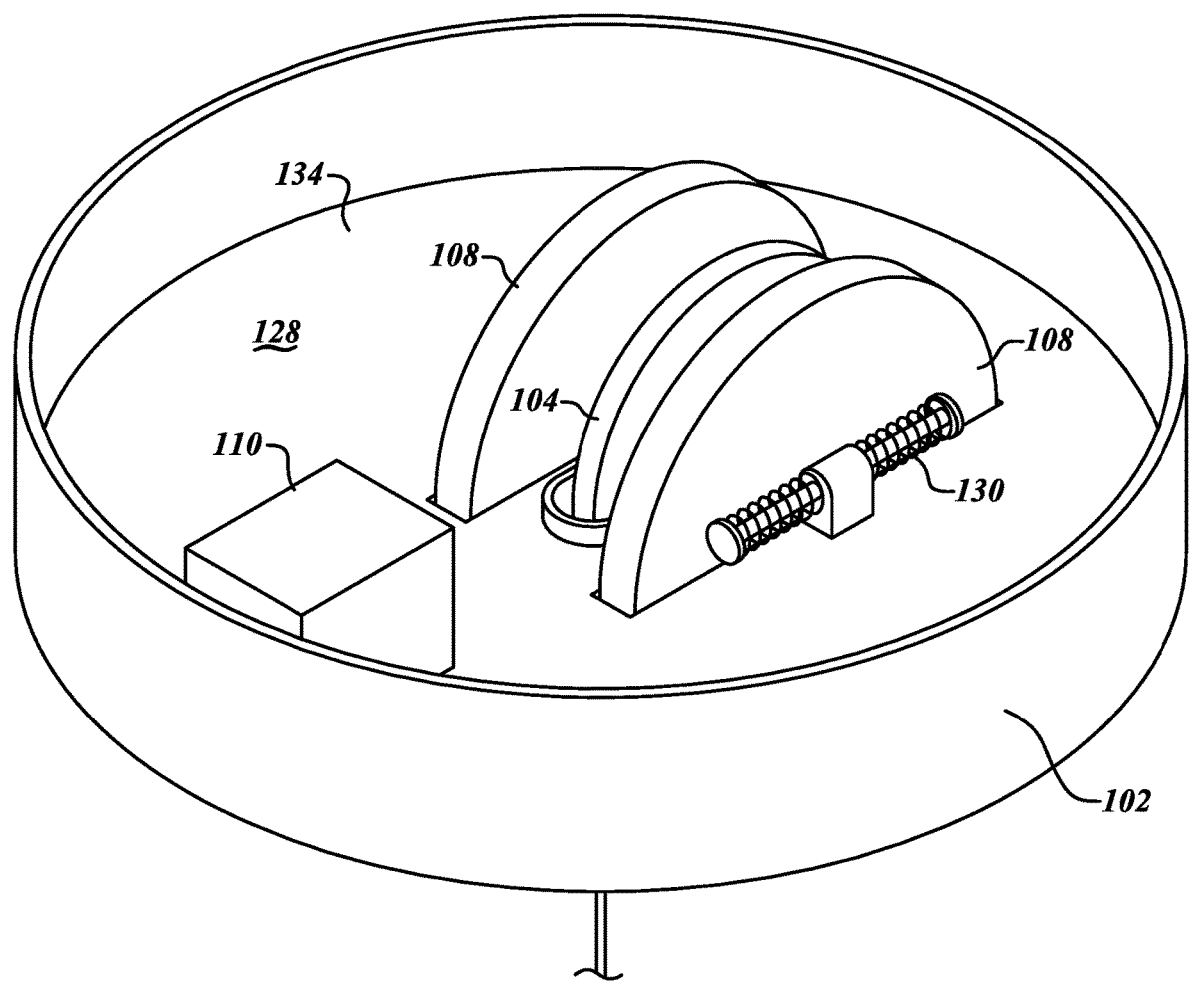
FIG. 4A is a perspective view of a portion of an interior of a sea wave energy harvesting vessel, according to one embodiment.

FIG. 4A is an elevated perspective view of an interior chamber 128, or equipment deck, of the sea wave energy harvesting vessel 102, according to one embodiment. The interior chamber 128 can be accessed by personnel via the port 122 (see FIGS. 3A, 3B). By accessing the interior chamber 128, personnel can perform control and maintenance operations within the sea wave energy harvesting vessel 102.

In one embodiment, the interior chamber 128 is defined by a floor 134. Personnel that enter the interior chamber 128 can stand on the floor 134 in order to perform maintenance and control operations within the interior chamber 128. In one embodiment, a ceiling (not shown) of the interior chamber 128 is far enough from the floor that a person of average height can stand straight within the interior chamber 128.

In one embodiment, a portion of the power takeoff drum 104 is positioned within the interior chamber 128. A portion of the power takeoff drum 104 extends below the floor 134. Technicians can access the power takeoff drum 104 from within the interior chamber 128.

In one embodiment, two generators 108 are positioned within the sea wave energy harvesting vessel 102. A portion of each of the generators 108 is positioned in the interior chamber 128. Portions of the generators 108 are positioned below the floor 134. Technicians can access the generators 108 via the interior chamber 128.

In one embodiment, the generators 108 are direct drive, multistage, axial flux outer stator permanent magnet generators. The generators can include the types of generators that have been in development for use in the wind power industry as a next generation solution to the standard generator/gearbox arrangement used in traditional systems. The ability to eliminate the gearbox at this scale of power leads to an increase in overall system reliability and simplicity, as well as capital cost reduction.

In one embodiment, a return spring 130 is coupled to the power takeoff shaft 132. The return spring 130 provides the minimum necessary return force to return the power takeoff drum 104 to its equilibrium position. Thus, the return spring 130 implements a safety feature that enables the power takeoff drum 104 to always return to its equilibrium position in the event of accident or malfunction.

In one embodiment, the return spring 130 also allows for a dead zone in the control system operation, allowing for easier detection of zero velocity points. The control and power electronics 110 can utilize the detection of zero velocity points to determine how to adjust the torque applied via the generators 108.

In one embodiment, the return spring 130 includes a rack and pinion assembly. The return spring 130 includes a mechanical coil spring with the rack and pinion assembly. The return spring 130 can store a portion of the power generated by the generators 108. The energy stored in the return spring 130 is used to provide the majority of the returning force required for the power takeoff drum 104.

In one embodiment, the wave energy harvesting system can utilize a fly wheel instead of the return spring 130. The fly wheel can be coupled to the power takeoff shaft by a gear box. During upward motion of the wave, the fly wheel can be engaged to the power takeoff shaft via the gear box in such a way that the rotation of the power takeoff shaft causes rotation of the fly wheel. In this way the fly wheel applies a torque to the power takeoff shaft that opposes rotation of the power takeoff shaft. The fly wheel can be disengaged from the power takeoff shaft during downward motion of the wave. In one embodiment, the wave energy harvesting system can utilize energy storage other than a fly wheel or a return spring.

In one embodiment, the control and power electronics 110 are positioned within the interior chamber 128. Technicians or other personnel can access the control and power electronics 110 via the interior chamber 128. The control and power electronics 110 are communicatively connected to the generators 108.

Figure 4B:
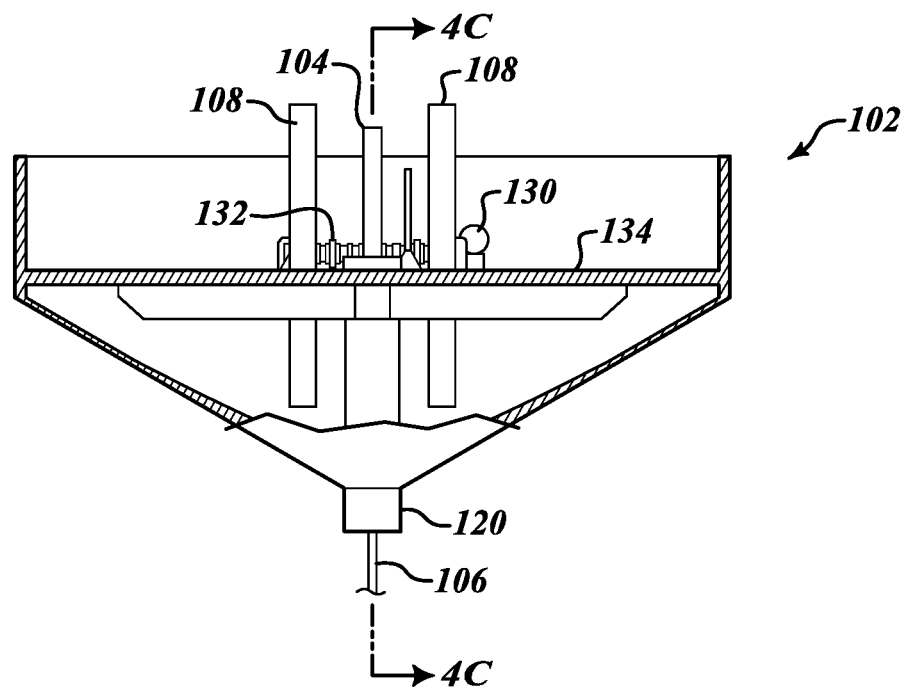
FIG. 4B is a cutaway side view of a portion of an interior of a sea wave energy harvesting vessel, according to one embodiment.

FIG. 4B is a cutaway side view of the sea wave energy harvesting vessel 102. The cutaway side view of FIG. 4B shows the interior chamber 128. The cutaway side view of FIG. 4B also shows the interior volume of the lower portion 125 of the sea wave energy harvesting vessel 102. The cutaway side view of FIG. 4B shows the power takeoff shaft 132 coupled to both generators 108, the power takeoff drum 104, and the return spring 130. The cutaway side view of FIG. 4B shows how portions of the generators 108 protrude below the floor 134 into the interior volume of the lower portion 125 of the sea wave energy harvesting vessel 102. The cutaway side view of FIG. 4B also shows the opening 126 through which the towing line 106 enters the interior of the sea wave energy harvesting vessel 102.

Figure 4C:
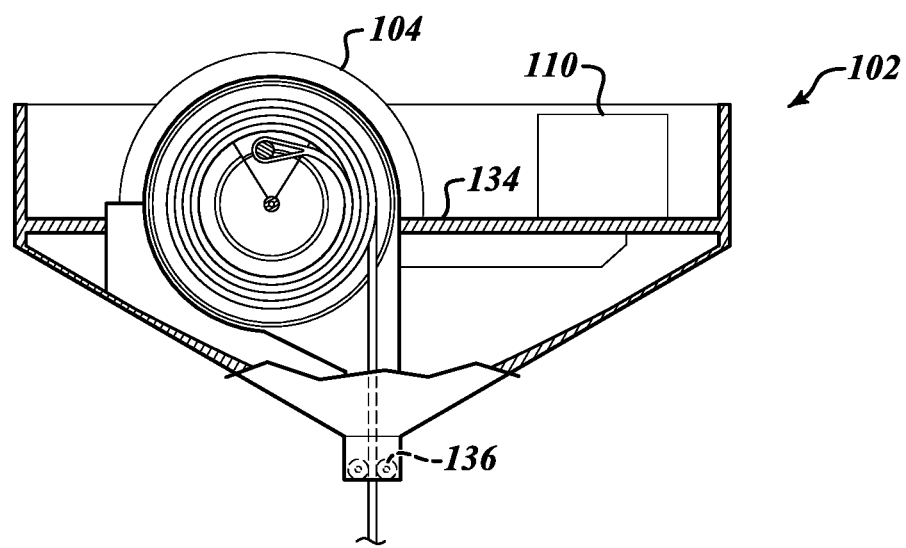
FIG. 4C is a side-section view of a portion of an interior of a sea wave energy harvesting vessel, according to one embodiment.

FIG. 4C is a cross-sectional view of the sea wave energy harvesting vessel 102 through lines 4B shown and FIG. 4B. The cross-sectional view of FIG. 4C shows an interior of the power takeoff drum 104 and how the towing line 106 is wound about the power takeoff drum 104. FIG. 4C also shows the guidance bearings 136 positioned within an interior of the opening 126. The guidance bearings maintain the towing line 106 improper position as the power takeoff drum 104 rotates back and forth, causing the towing line 106 to rise and fall through the opening 126. The guidance bearings 136 are in contact with the towing line 106 and rotate with the movement of the towing line 106.

Figure 5A:
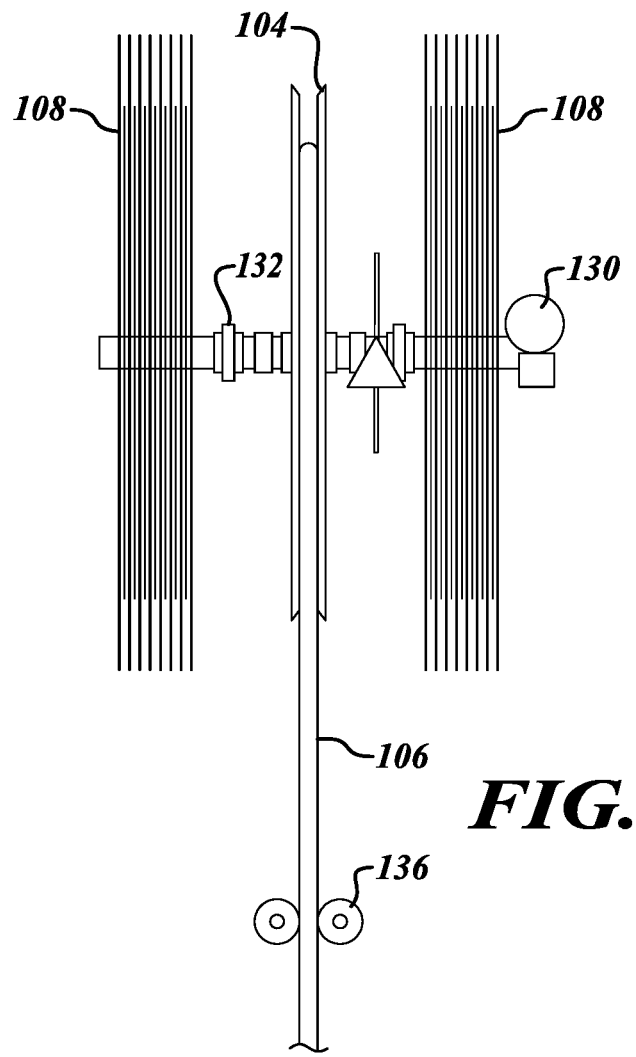
FIG. 5A is a front view of a power takeoff drum and generator of a sea wave energy harvesting vessel, according to one embodiment.

FIG. 5A is a front view of the generators 108 and the power takeoff drum 104, according to one embodiment. The view of FIG. 5A does not show the body of the sea wave energy harvesting vessel 102. The generators 108 are coupled to the power takeoff shaft 132 in a manner that rotation of the power takeoff shaft 132 will cause rotation of the rotors of the generators 108, and rotation of rotors of the generators 108 will cause rotation of the power takeoff shaft 132. The power takeoff drum 104 is also coupled to the power takeoff shaft 132. The spring 130 is also coupled to the power takeoff shaft 132. FIG. 5A also illustrates how the towing line 106 passes from the power takeoff drum 104 through the guidance bearings 136.

In one embodiment, the generators 108 each include a rotor and a stator. The generators 108 can include coil of magnet configurations to facilitate generating electricity and applying torque to the power takeoff shaft 132.

Figure 5B:
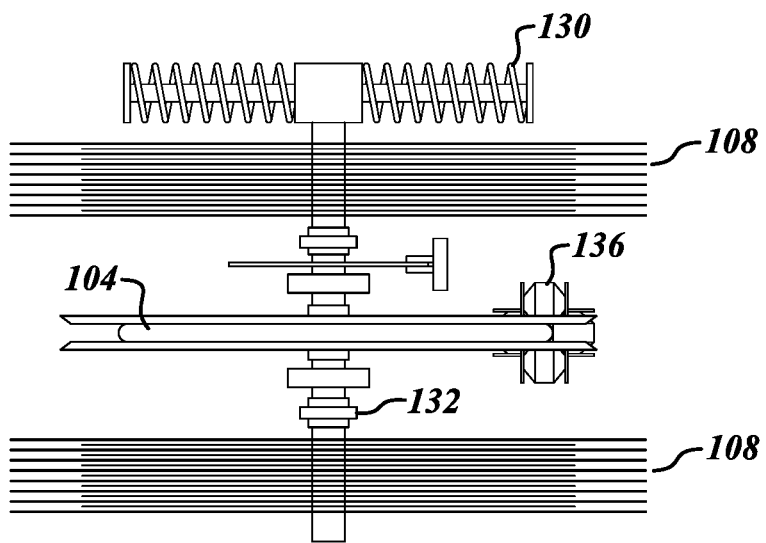
FIG. 5B is a top view of a power takeoff drum and generator of the sea wave energy harvesting vessel of FIG. 5B, according to one embodiment.

FIG. 5B is a top view of the generators 108, the power takeoff drum 104, and the power takeoff shaft 132, according to one embodiment. The view of FIG. 5B further illustrates the orientation of the various components within the sea wave energy harvesting vessel 102.

Figure 6A:
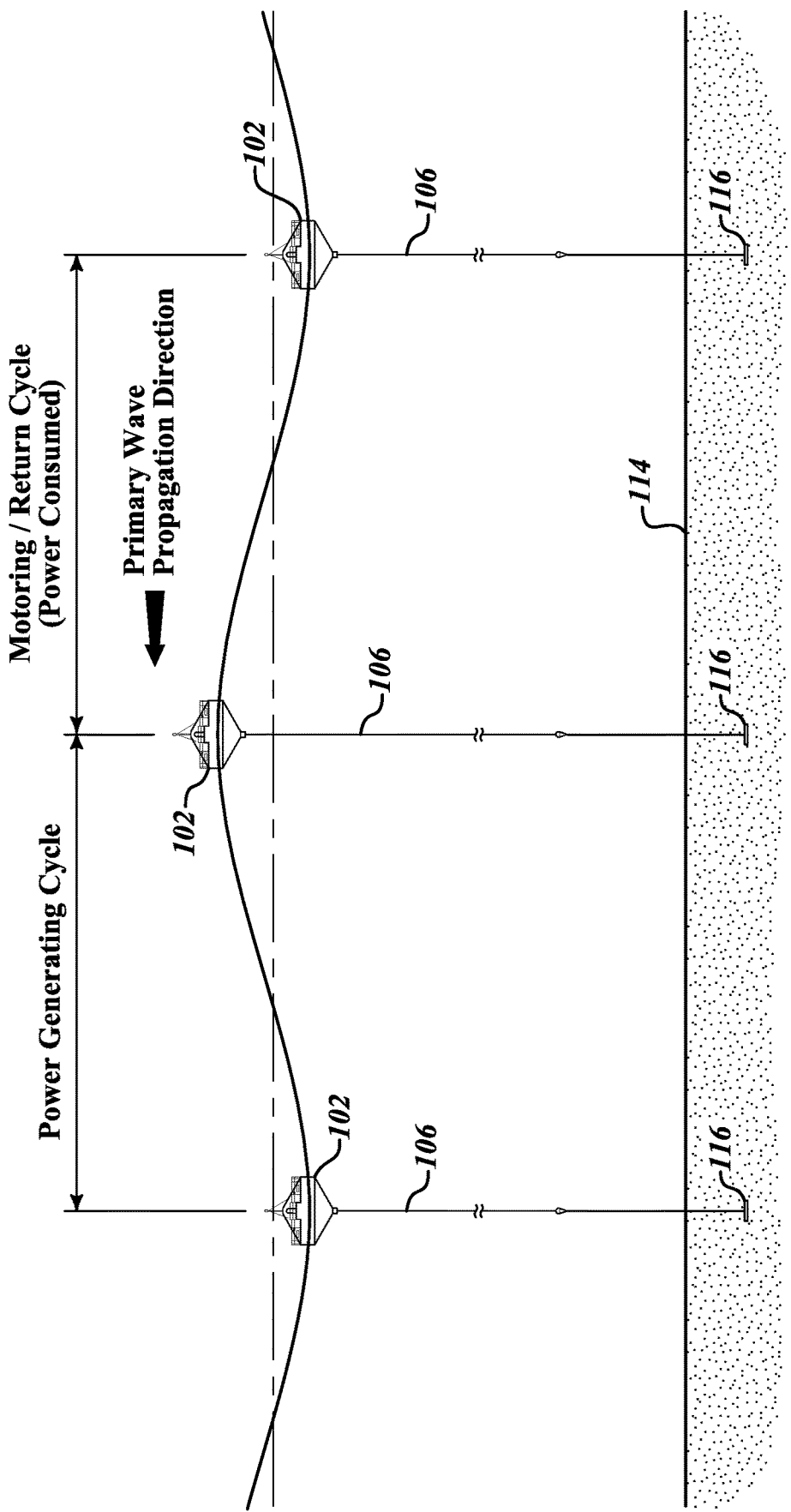
FIG. 6A is an illustration of motion of a wave energy harvesting vessel with the motion of sea waves, according to one embodiment.

FIG. 6A is an illustration of how the position of the sea wave energy harvesting vessel changes throughout a single wave cycle, according to one embodiment. FIG. 6A illustrates the motoring portion of the wave cycle and the power generating portion of the wave cycle. The sea wave energy harvesting vessel 102 is shown at three positions during a wave cycle.

In one embodiment, the power generating cycle corresponds to the portion of the wave cycle during which the sea wave energy harvesting vessel rises from the trough of the sea wave to the crest of the sea wave. During the power generation cycle, the rising of the sea wave and the buoyant forces associated with the sea wave energy harvesting vessel 102 because the sea wave energy harvesting vessel to rise with the sea wave. As the sea wave energy harvesting vessel rises, the towing line 106 unwinds about the power takeoff drum 104. The unwinding of the towing line 106 causes the power takeoff drum 104 to rotate. The rotation of the power takeoff drum 104 causes the power takeoff shaft 132 to rotate. The rotation of the power takeoff shaft 132 causes the rotor of the generator 108 to rotate. The rotation of the rotor causes the generator 108 to generate electricity. In this way, the sea wave energy harvesting vessel 102 harvests energy from the sea waves during the rising portion of the sea wave cycle in the form of electricity.

In one embodiment, the motoring cycle corresponds to the portion of the wave cycle during which the sea wave energy harvesting vessel 102 falls from the crest of the sea wave to the trough of the sea wave. During the motoring cycle, the control and power electronics 110 utilize the generator 108 as a motor to pull the sea wave energy harvesting vessel 102 downward in such a way that the resonant frequency of the sea wave energy harvesting vessel 102 matches the frequency of the sea waves. During the motoring cycle, the control and power electronics 110 apply power to the stator of the generator 108. The application of power to the stator of the generator 108 causes the rotor to apply a torque to the power takeoff shaft 132, causing the power takeoff drum 104 to rotate. The power takeoff drum is forced to rotate in a way that winds the towing line 106 about the power takeoff drum 104. The winding of the towing line 106 about the power takeoff drum 104 has the effect of pulling the sea wave energy harvesting vessel 102 toward the seafloor 114. The result is that during the rising portion of the sea wave cycle, the sea wave energy harvesting vessel 102 rises farther and faster. This, in turn, results in harvesting a greater amount of energy from the sea wave than in the absence of the motoring cycle.

In one embodiment, the control and power electronics 110 control the generator 108 to apply a torque to the power takeoff shaft 132 during both the power generating cycle and the motoring cycle. The torque is selected to cause the resonant frequency of the sea wave energy harvesting vessel 102 to match the frequency of the sea waves. The amount of torque applied by the generator 108 is adjusted throughout the power generating cycles in the motoring cycles. During the motoring cycle, the applied torque has the effect of pulling the sea wave energy harvesting vessel 102 downward. During the power generating cycle the applied torque has the effect of providing a load against which the generator 108 generate electricity.

Figure 6B:
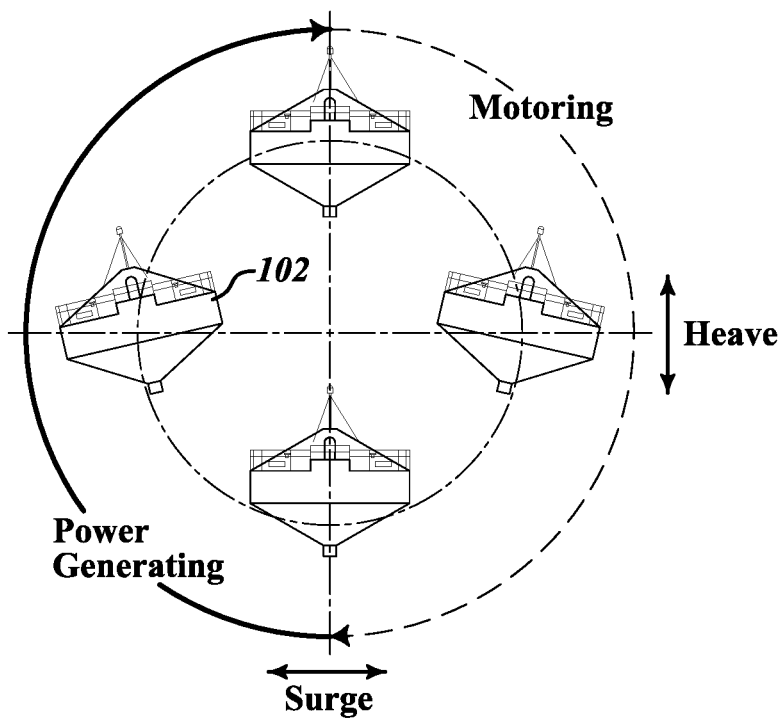
FIG. 6B is an illustration of how a sea wave energy harvesting vessel motors and generates power during a sea wave, according to one embodiment.

FIG. 6B is an illustration of the motion of the sea wave energy harvesting vessel during both the power generating cycle and the motoring cycle. FIG. 6B illustrates that not only does the sea wave energy harvesting vessel rise and fall with the rise and fall of the sea waves, but the sea wave energy harvesting vessel 102 heaves from side to side with the heave of the wave.

In one embodiment, the sea wave energy harvesting vessel 102 is free-floating in 6 degrees of freedom (DOF) and generates power in the heave, surge & sway components of the sea wave energy harvesting vessel 102 motion for 3 DOF power production. The sea wave energy harvesting vessel 102 is designed to produce power only on the up-swell of the wave by generating high tensile forces in the towing line 106 between the sea wave energy harvesting vessel 102 and the embedded anchor plate, which rotates the power takeoff drum 104 in its bearings and produces high torque, low RPM power at the directly driven generators 108. On the down-swell of the wave the sea wave energy harvesting vessel 102 operates in a power takeoff "motoring" condition by powering the generators in the opposite direction to return the sea wave energy harvesting vessel 102 to its home position at the bottom of the wave by reeling in the main power takeoff mooring line. The power production cycle is then restarted.

Figure 6C:
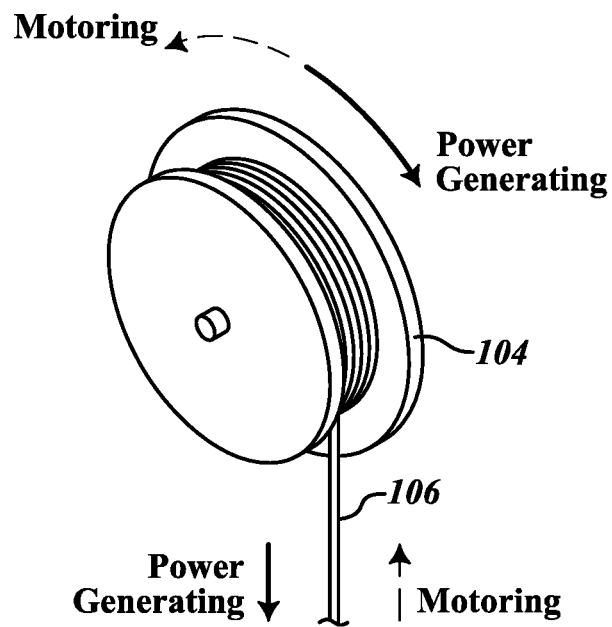
FIG. 6C is an illustration of the motion of a power takeoff drum internal to a wave energy harvesting vessel during motoring and power generation phases, according to one embodiment.

FIG. 6C illustrates the direction of rotation of the power takeoff drum 104 during the motoring and power generating cycles. During the motoring cycle, the rotation of the power takeoff drum 104 causes the upward motion of the towing line 106, thereby winding the towing line about the power takeoff drum 104. During the power generating cycle, the rotation of the power takeoff drum 104 causes the unwinding of the towing line 106 about the power takeoff drum 104.

Figure 7:
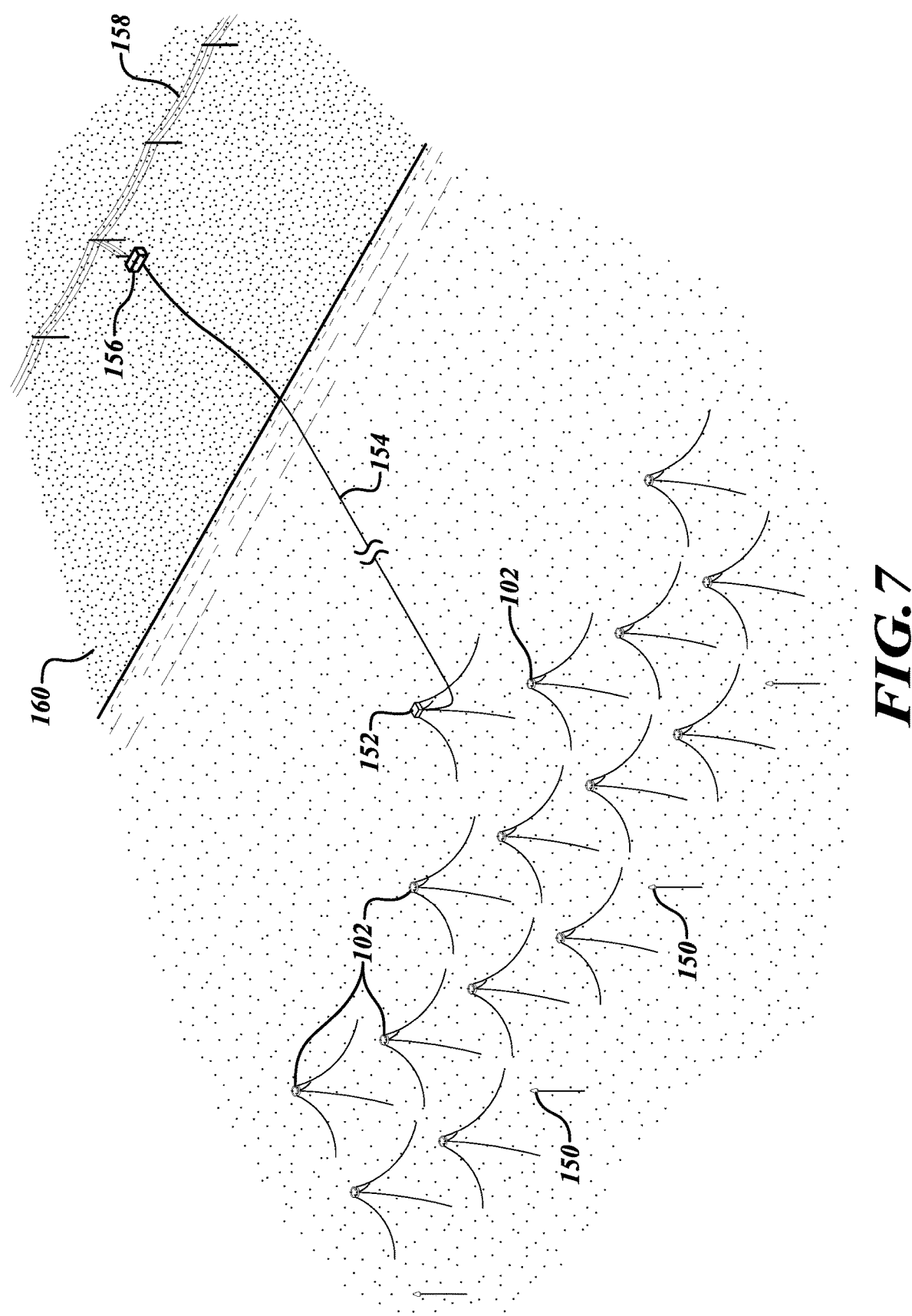
FIG. 7 is an illustration of a wave farm, according to one embodiment.

FIG. 7 is an illustration of a wave farm 170 including a plurality of sea wave energy harvesting vessels 102, according to one embodiment. The wave energy farm 170 utilizes the plurality of wave energy harvesting vessels 102 to generate electricity.

In one embodiment, the wave farm 170 includes a plurality of sea wave energy harvesting vessels 102 positioned in the water. The wave farm 170 includes a plurality of wave forecast buoys 150 positioned in the water at a position to experience sea waves before the sea waves reach the sea wave energy harvesting vessel 102. The wave farm 170 includes a floating power processor 152. The wave farm includes the power grid tie-in 156 positioned on the shore 160. The grid tie-in 156 is coupled to the floating power processor by a power line 154. The grid tie-in 156 is coupled to overhead power lines 158.

In one embodiment, the wave forecast buoys 150 float in the sea and are anchored to the seafloor ahead of the sea wave energy harvesting vessel 102. The wave forecast buoys periodically detect wave conditions. The detected wave conditions can include wave period/frequency, wave height, and wave direction. The wave forecast buoys 150 transmit wave forecast data indicating the current wave conditions to the sea wave energy harvesting vessels 102. The sea wave energy harvesting vessels 102 apply torque to their respective power takeoff shafts in such a way to align the resonant frequencies of the sea wave energy harvesting vessels 102 with the current wave conditions. In this way, the entire group of sea wave energy harvesting vessels 102 can dynamically adjust the resonant frequencies to match current sea conditions in order to more efficiently harvest energy from the sea waves.

In one embodiment, each sea wave energy harvesting vessel 102 conditions the electricity prior to passing the electricity to the floating power processor 152. The floating power processor 152 further processes the electricity and passes the electricity to the grid tie-in 156. The grid tied-in 156 may further condition the electricity before supplying electricity to the overhead lines 158.

In one embodiment, the floating power processor 152 is a power transfer station that is based at sea. In one embodiment, the power transfer station is instead based on land.

In one embodiment, wave farm 170 can include any desired number of sea wave energy harvesting vessels. The floating power processor 152 is used for temporary storage of power and power conditioning prior to sending to shore and tying to the grid. This reduces the total cost of power electronics and power storage required for each sea wave energy harvesting vessel 102 in the wave farm 170.

In one embodiment, each sea wave energy harvesting vessel can gather spectral data to determine optimal damping in the current sea state. Additionally, the data from each wave forecast buoy 150 can be used to adjust the damping at each sea wave energy harvesting vessel 102 adjacent to the wave forecast buoy 150 in the wave farm for optimal farm output.

In one embodiment, the wave forecasting buoys 150 can be arranged in a manner that will allow accurate forecasting and determination of the current sea state ahead of the array of sea wave energy harvesting vessels 102. This can allow the power takeoff damping for each sea wave energy harvesting vessel 102 in the wave farm 170 to be tuned for enhanced power output of the farm.

In one embodiment, research on this method has shown at least a 20% increase in overall power. This strategy can be implemented early in the development phase of the wave farm with consideration for the addition of future wave energy harvesting vessels to the array.

In one embodiment, the layout of the array can be optimized for packing density and power production on a site-specific basis. There can be a minimum safe distance between sea wave energy harvesting vessel 102 so that in the event of a storm survival condition, the sea wave energy harvesting vessels, and their mooring lines, will collide not with one another.

In one embodiment, the wave farm 170 can be serviced by a fleet of vessels and any one sea wave energy harvesting vessel 102 can be removed from its mooring and towed to dry dock if required with minimal to no impact to the other sea wave energy harvesting vessel 102. The array is configured in such a way that waves coming from an angle from the primary propagation direction will still be able to produce maximum power. In one embodiment, each sea wave energy harvesting vessel 102 produces around 1 MW with a 25-30 kw/m wave energy flux.

Figure 8:
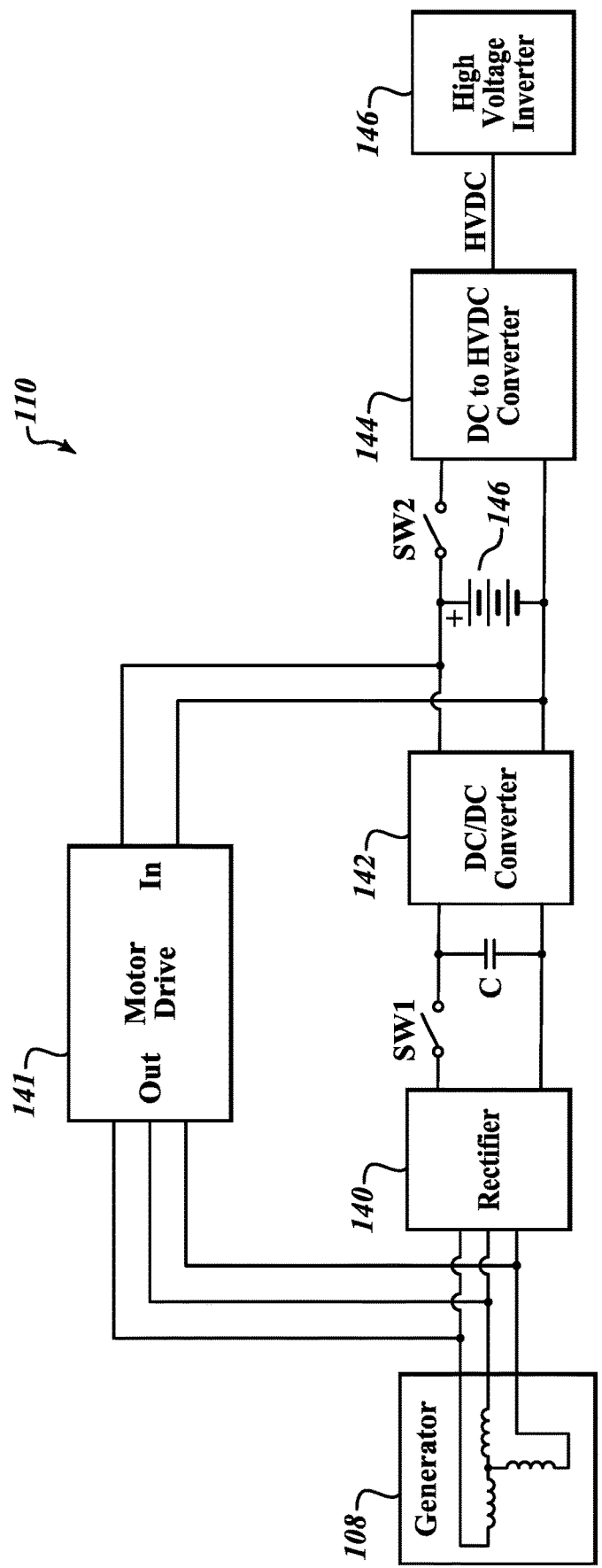
FIG. 8 is a schematic diagram of control electronics of a wave energy harvesting system, according to one embodiment.

FIG. 8 is a schematic diagram of control and power electronics 110, according to an embodiment. The generator 108 generates electricity in an AC waveform. The rectifier 140 receives the AC waveform, rectifies the AC waveform, then outputs a DC voltage. A switch SW1 selectively enables the rectifier 140 to pass the DC voltage to the DC to DC converter 142. The DC to DC converter 142 receives the DC voltage from the rectifier 140 and converts the DC voltage to a standardized DC voltage. The DC to DC converter charges a battery 146. The terminals of the battery 146 can be selectively connected to a DC to high voltage DC converter 144 by a switch SW2. The DC to DC converter 144 converts the standardized voltage to a high DC voltage and passes the high DC voltage to an inverter 146. The inverter 146 receives the high voltage DC signal and generates an AC voltage signal. The AC voltage signal can be output to the floating power processor 152 or to the grid tie-in 156.

In one embodiment, the motor drive 141 receives the DC voltage from the battery 146. The motor drive 141 selectively outputs a voltage to the generator 108 in order to cause the generator 108 to behave as a motor. The voltage applied to the generator 108 causes the generator to apply a torque to the power takeoff shaft 132. The motor drive 134 applies the voltage to the generator 108 in accordance with software instructions executed by a processor. The software instructions take into account the current wave conditions and cause the motor drive 134 to control the generator 108 to apply the torque to the power takeoff shaft 132.

Those of skill in the art will recognize, in light of the present disclosure, that the control and power electronics 110 can include different components and different arrangements of components than those shown and described with relation to FIG. 8 for controlling the generator 108 and for processing electricity generated by the generator 108. All such other components and arrangements of components fall within the scope of the present disclosure.

In one embodiment, the mass of the sea wave energy harvesting vessel 102 can be kept relatively low due to the ability of the sea wave energy harvesting vessel 102 to dynamically adjust its own spring constant k. Usually, a device will have a high natural frequency which will be far higher than the way frequency. However, the design of the sea wave energy harvesting vessel 102 enables the mass to be kept low while reducing the value of the natural frequency by employing a negative spring force from the motor control. Also, because of the action of the mechanical spring 130, the displaced mass of the device is greater than the actual mass, meaning that volume can be larger than would be the case without the mechanical spring 130. The result is that the mass of the sea wave energy harvesting vessel 102 can be kept low, thereby reducing costs and increasing efficiency of the system overall.

Figure 9A:
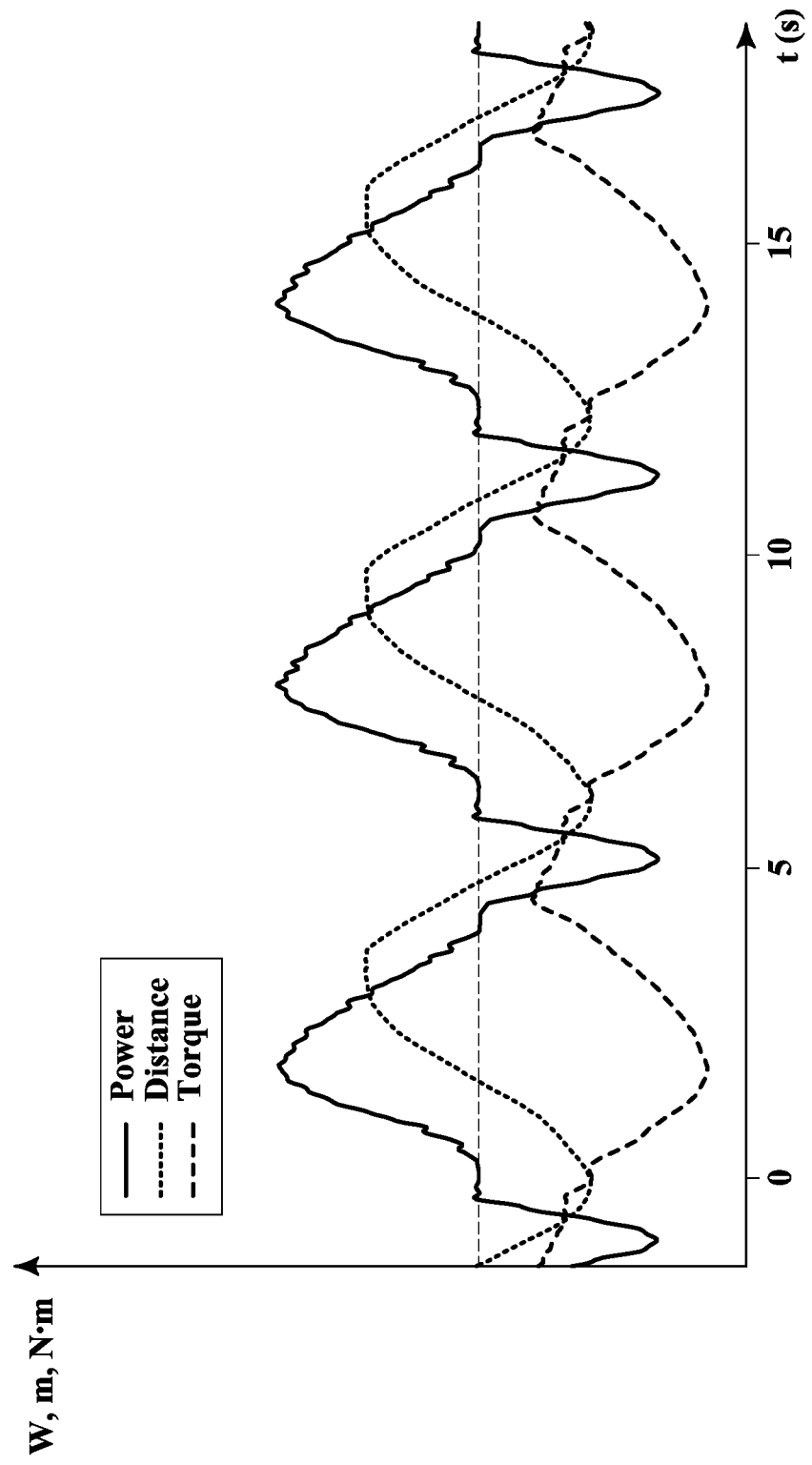
FIGS. 9A-9C are graphs of various parameters of a sea wave energy harvesting vessel, according to one embodiment.

FIG. 9A is a graph including curves for each of power generated by a scaled down prototype, displacement of the scaled down prototype, and torque applied by the generator to the power takeoff, all as a function of time in seconds, according to one embodiment. A horizontal dashed line corresponds to equilibrium displacement of the sea wave energy harvesting vessel prototype, zero power generation, and zero torque. The graph includes three wave cycles. A varying negative torque is applied throughout the wave cycles. The negative torque acts to drive the sea wave energy harvesting vessel downward during falling portions of the sea waves. The negative torque asked to dampen the rotation of the power takeoff drum during rising portions of the sea waves. Power generation primarily occurs during upward motion of the sea wave energy harvesting vessel 102.

Figure 9B:
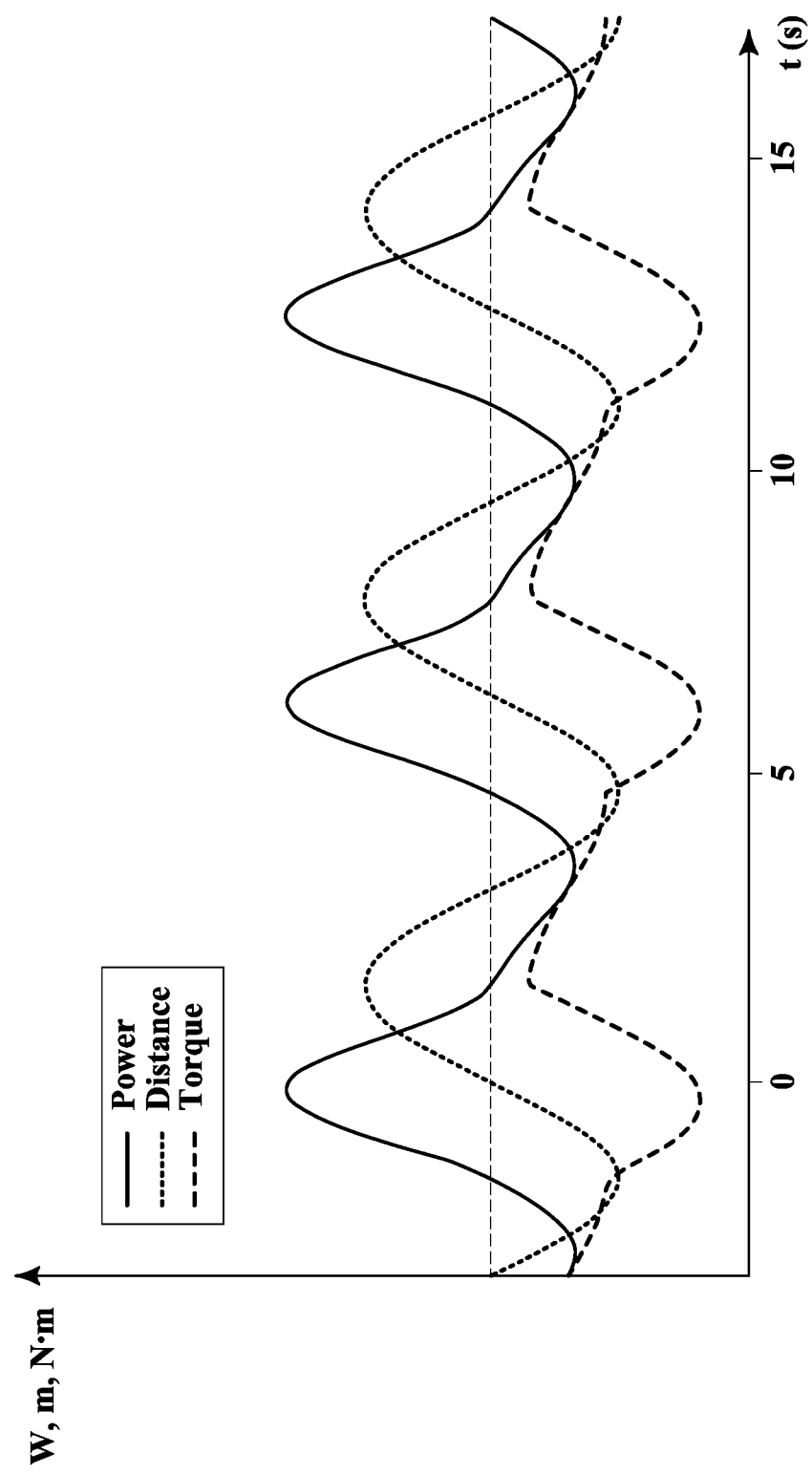

FIG. 9B is a graph including curves for each of power generation, displacement and torque applied to a generator is generated in accordance with a theoretical model describing operation of a sea wave energy harvesting vessel, according to one embodiment. The curves generated by the theoretical model in FIG. 9B match fairly well with the curves measured from the scaled down prototype in FIG. 9A.

Figure 9C:
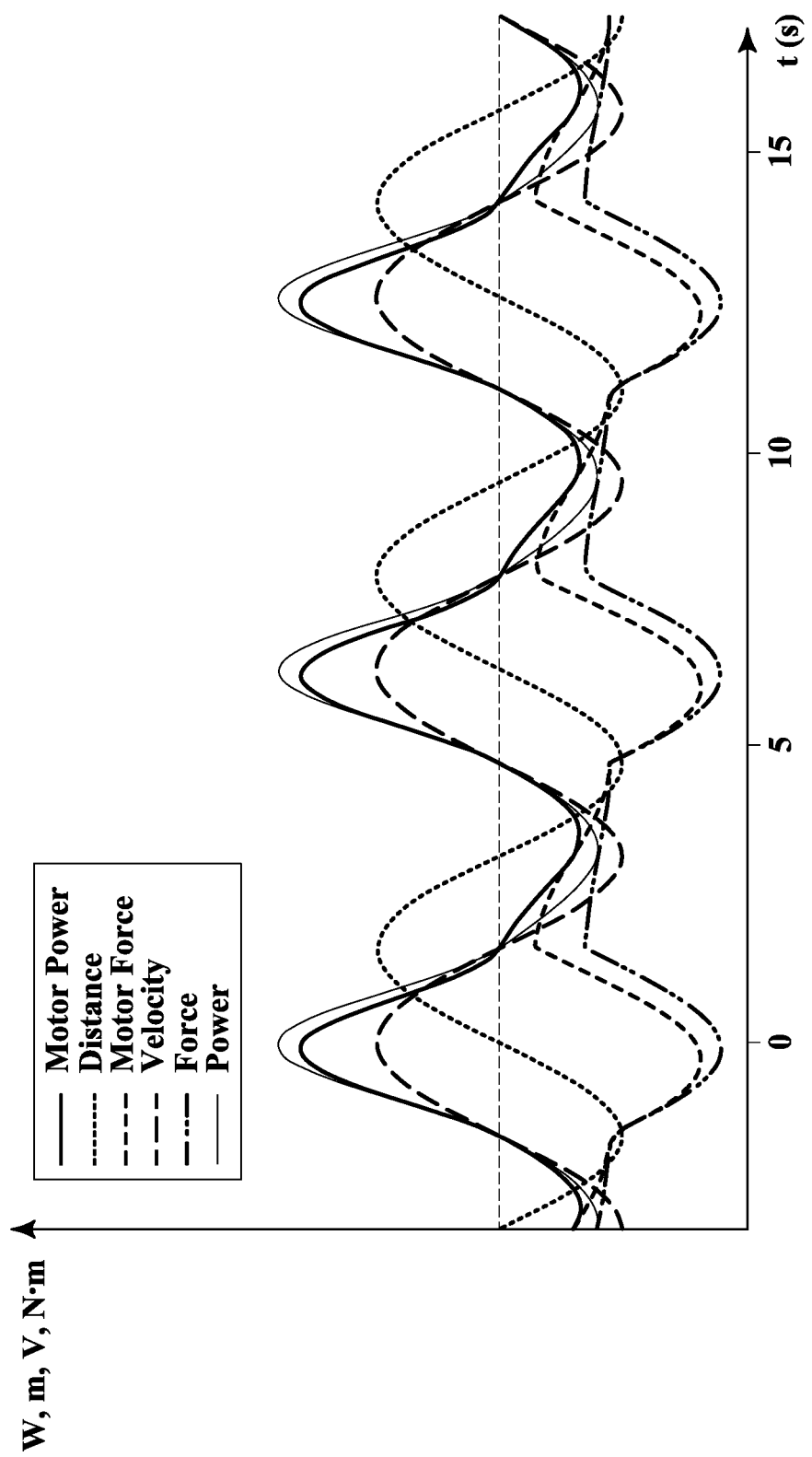

FIG. 9C is a graph including several curves generated in accordance with a theoretical model describing operation of a sea wave energy harvesting vessel, according to one embodiment. The graph includes a curve for motor power applied to the generator, displacement, force generated by the motor, the velocity of the sea wave energy harvesting vessel 102, force generated by the power takeoff drum 104, and power generated by the generator 108.

Figure 10:
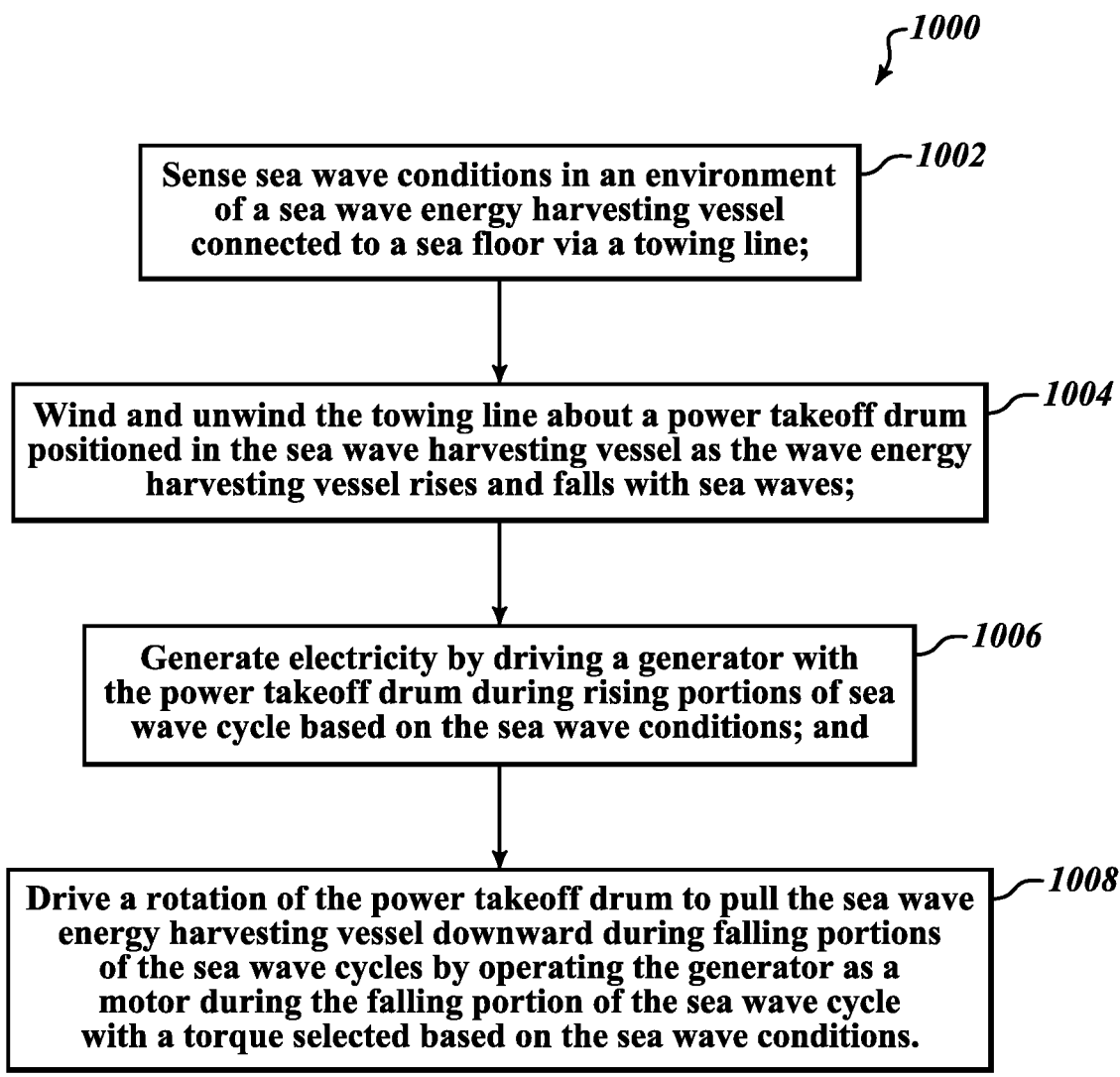
FIG. 10 is a flow chart diagram of a method for harvesting energy from sea waves, according to one embodiment.

FIG. 10 is a flow diagram of a process 1000 for operating a sea wave energy harvesting system, according to one embodiment. At 1002, sea wave conditions are sensed in an environment of a sea wave energy harvesting vessel connected to a sea floor via a towing line. At 1004, the towing line is wound and unwound about a power takeoff drum positioned in the sea wave energy harvesting vessel as the wave energy harvesting vessel rises and falls with sea waves. At 1006, electricity is generated by driving a generator with the power takeoff drum during rising portions of sea wave cycle based on the sea wave conditions. At 1008 a rotation of the power takeoff drum is driven to pull the sea wave energy harvesting vessel downward during falling portions of the sea wave cycles by operating the generator as a motor during the falling portion of the sea wave cycle with a torque selected based on the sea wave conditions.

In one embodiment, sensing sea wave conditions includes sensing a height of the sea waves. In one embodiment, the torque is selected based on the height of the sea waves.

In one embodiment, the process 1000 includes outputting electricity generated by the generator from the sea wave energy harvesting vessel to a power transfer station. In one embodiment, the process 1000 includes conditioning the electricity generated by the generator prior to outputting the electricity to the power transfer station by performing one or more of rectifying the electricity, transforming the electricity, or inverting the electricity.

In one embodiment, sensing the sea wave conditions includes sensing the sea wave conditions with a wave forecast buoy positioned in an environment of the sea wave energy harvesting vessel.

In one embodiment, sensing the sea wave conditions includes sensing the sea wave conditions with one or more sensors positioned in the sea wave energy harvesting vessel.

In general, in the condition data following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising: a wave energy harvesting vessel positioned in a body of water and configured to rise and fall with waves in the body of water, the wave energy harvesting vessel including:
   a towing line configured to couple the sea wave energy harvesting vessel to the sea floor, the sea wave energy harvesting vessel including:
   a power takeoff drum, the towing line being connected to the power takeoff drum wherein the towing line is configured to wind and unwind about the power takeoff drum as the wave energy harvesting vessel rises and falls with the waves;
   a generator including a rotor rotationally coupled to the power takeoff drum;
   one or more processors; and
   at least one computing device coupled to the one or more processors;
   wherein the one or more processors are configured to:
   control the generator to generate electricity during upward portions of wave cycles based on rotation of the power takeoff drum causing rotation of a rotor within the generator;
   control the generator to cause the rotor to drive rotation of the power takeoff drum during downward portions of the wave cycles, the power takeoff drum rotated in a way that winds the towing line about the power takeoff drum;
   create a torque profile, the torque profile augmenting the rotation of the power takeoff drum or resisting the rotation of the power takeoff drum during the upward portions and the downward portions of the wave cycles to match the resonant frequency of the sea wave energy harvesting vessel with the frequency of the sea waves, overwriting, when the wave energy harvesting vessel exceeds a low position limit, a torque command with a static damping only value; and
   command, when the wave energy harvesting vessel exceeds a high position limit, zero torque to be applied.

2. The system of claim 1, the torque profile including a torque that varies in a selected manner during the downward portions of the wave cycles.

3. The system of claim 1, the wave energy harvesting vessel further comprising a brake;
   wherein the one or more processors are further configured to:
   operate the generator to apply a torque to the power takeoff drum to entirely submerge the wave energy harvesting vessel;
   operate the generator to apply the brake to the power takeoff drum, to prevent upward travel when the wave energy harvesting vessel has been fully submerged.

4. The system of claim 1, the wave energy harvesting vessel further comprising:
   an interior chamber accessible by one or more users by a port, the power takeoff drum accessible within the interior chamber;
   an external rail, the external rail configured to enable the one or more users to stand on an external surface of the wave energy harvesting vessel.

5. The system of claim 4, the wave energy harvesting vessel further comprising:
   a second generator wherein the first and second generators are each supported at four points, the four points comprising two points closest to a center of the wave energy harvesting vessel having a downward direction and two points further away from the center of the wave energy harvesting vessel having an upward direction, wherein loads of the first and second generators and the power takeoff drum are transferred to main support beams of the wave energy harvesting vessel wherein the loads are then transferred to a power takeoff structure support tube and a reinforcement ring and the external surface through a set of support beams mounted against a hull plating, and through hull stringers and stiffeners to the hull plating wherein the wave energy harvesting vessel is supported by water pressure exerted across a wetted portion of the wave energy harvesting vessel.

6. The system of claim 3, the wave energy harvesting vessel further comprising: one or more sensors, the one or more sensors configured to sense motor current, motor voltage, drum position, and drum velocity and wave forecasting data;
   wherein the one or more processors are further configured to:
   receive data collected by the one or more sensors; and
   create the torque profile in accordance with the received data.

7. The system of claim 6, the one or more sensors configured to monitor the motor current and velocity and movement of the wave energy harvesting vessel, the one or more sensors including a three-axis accelerometer.

* * * * *